(12) United States Patent
Hanley

(10) Patent No.: US 9,095,785 B2
(45) Date of Patent: Aug. 4, 2015

(54) METHOD OF OPTIMIZING PRODUCT OUTPUT RATE OF PACKED COLUMNS

(71) Applicant: Aspen Technology, Inc., Burlington, MA (US)

(72) Inventor: Brian Hanley, Lowell, MA (US)

(73) Assignee: Aspen Technology, Inc., Bedford, MA (US)

( * ) Notice: Subject to any disclaimer, the term of this patent is extended or adjusted under 35 U.S.C. 154(b) by 218 days.

(21) Appl. No.: 13/874,026

(22) Filed: Apr. 30, 2013

(65) Prior Publication Data
US 2013/0248348 A1    Sep. 26, 2013

Related U.S. Application Data

(62) Division of application No. 12/765,611, filed on Apr. 22, 2010, now Pat. No. 8,449,727.

(60) Provisional application No. 61/276,098, filed on Sep. 8, 2009.

(51) Int. Cl.
| | |
|---|---|
| *B01D 3/42* | (2006.01) |
| *B01J 19/00* | (2006.01) |
| *B01J 19/30* | (2006.01) |
| *B01J 19/32* | (2006.01) |

(52) U.S. Cl.
CPC .......... *B01D 3/4211* (2013.01); *B01J 19/0033* (2013.01); *B01J 19/30* (2013.01); *B01J 19/32* (2013.01); *B01J 2219/319* (2013.01); *B01J 2219/326* (2013.01); *B01J 2219/3325* (2013.01)

(58) Field of Classification Search
CPC .............. B01D 3/14; B01D 3/26; B01D 3/42; B01D 3/4211
USPC ......................................................... 203/1, 2
See application file for complete search history.

(56) References Cited

U.S. PATENT DOCUMENTS 8,449,727 B2    5/2013   Hanley

OTHER PUBLICATIONS

Billet, R., "Recent Investigations of Metal Pall Rings", *Chem. Eng. Prog.* 63(9) (1967).
Broadbent, S.R.; Hammersley, J.M., "Percolation Processes I. Crystals and Mazes", *Proc. Cambridge Philos. Soc. 53* (1957).

(Continued)

*Primary Examiner* — Robert A Hopkins
(74) *Attorney, Agent, or Firm* — Hamilton, Brook, Smith & Reynolds, P.C.

(57) ABSTRACT

A product output rate for a packed column is optimized by setting a desired product output rate from the distillation column, calculating a fraction of flood point of the distillation column at a reflux ratio, and determining a pressure drop value within the distillation column at the fraction of flood point. The step of determining the pressure drop employs the method of producing a plot of pressure drop as a function of fraction of flood point at any liquid flow rate, or producing a mathematical expression thereof. The method of optimizing a product output rate from a distillation column then includes calculating a pressure at a point in the distillation column for a pressure at a different point in the distillation column, calculating the pressure drop within the distillation column of a given length, calculating a temperature corresponding to the calculated pressure at a point in the distillation column, and adjusting the desired product output rate or the reflux ratio or the pressure at a different point in the distillation column.

26 Claims, 24 Drawing Sheets

(56) References Cited

OTHER PUBLICATIONS

Ender, C.; Hanley, B., "Packing Pressure Drop Estimation via Bilinear Regression", 2003 AIChE Spring Mtg., New Orleans, LA, paper 8g.

Essam, J.W., "Percolation and Cluster Size" in *Phase Transitions and Critical Phenomena*, vol. 2, C. Domb and M.S. Green eds., Academic Press, New York (1972).

Fitz, C.W., et al., "Performance of Structured Packing in a Commercial Scale Column at Pressures of 0.02 to 27.6 Bar", *Ind. Eng. Chem. Res. 38*(2) (1999).

Frisch, H.L.; Hammersley, J.M., "Percolation Processes and Related Topics", *J. Soc. Indust. Appl. Math. 11*(4) (1963).

Galam, S.; Mauger, A., "Site Percolation Thresholds in All Dimensions", *Physica A 205* (1994).

Gingold, D.B.; Lobb, C.J., "Percolative Conduction in Three Dimensions", *Phys. Rev. B 42*(13) (1990).

Hanley, B.; Dunbobbin, B.; Bennett, D., "A Unified Model for Countercurrent Vapor/Liquid Packed Columns. 1. Pressure Drop", *Ind. Eng. Chem. Res. 33* (1994).

Hong, D.C.; Stanley, H.E.; Coniglio, A.; Bunde, A., "Random-Walk Approach to the Two-Component Random-Conductor Mixture: Perturbing Away from the Perfect Random Resistor Network and Random Superconducting-Network Limits", *Phys. Rev. B 33*(7) (1986).

Kean, J.A.; Turner, H.M.; Price, B.C., "Structured Packing Proven Superior for TEG Gas Drying", *Oil & Gas J.*, Sep. 23, 1991, p. 41.

Kister, H.Z.; Gill, D.R., "Predict Flood Point and Pressure Drop for Modern Random Packings", *Chem. Eng. Prog. 87*(2) (1991).

Krehenwinkel, H.; Knapp, H., "Pressure Drop and Flooding in Packed Columns Operating at High Pressures", *Chem. Eng. Tech. 10* (1987).

Landau, D.P., "Computer Simulation Studies of Critical Phenomena", *Physica A 205* (1994).

Lerner, B.J.; Grove, C.S., "Critical Conditions of Two-Phase Flow in Packed Columns", *Ind. Eng. Chem. 43*(1) (1951).

Meier, W.; Stoecker, W.D.; Weinstein, B., "Performance of a New, High Efficiency Packing", *Chem. Eng. Prog.*, Nov. 1977, p. 71.

Rukovena, F.; Koshy, T.D., "Packed Distillation Tower Hydraulic Design Method and Mechanical Considerations", *Ind. Eng. Chem. Res. 32* (1993).

Schultes, M., "New Comparisons of High Effective Modern Dumped Packings and Systematic Packed Columns", *I.Chem. E. Symp. Ser. 142*(2) (1997).

Shaoting, W.; Zuoxiang, Z.; Xiyuan, L., "Investigation on Rectifying Characteristics of Two New Tower Packings", *J. Chem. Ind. & Eng.* (China) 2 (1990).

Wallis, G.B., *One-Dimensional Two-Phase Flow*, McGraw Hill, 2nd Edition, New York, 1979.

Wu, K.Y.; Chen, G.K., "Large-Scale Pilot Columns and packed Column Scale-Up", *I. Chem.E. Symp. Ser. 104*, B225.

Yeomans, J.M., *Statistical Mechanics of Phase Transitions*, Clarendon Press, Oxford, 1993.

Zanetti, R.; Short, H.; Hope, A., "Boosting Tower Performance by More than a Trickle", *Chem. Eng.*, May 27, 1985, p. 22.

Zenz, F.A., "What Every Engineer Should Know About Packed Tower Operations", *Chem. Eng.*, Aug. 1953, p. 176.

Kister et al., "Realistically Predict Capacity and Pressure Drop for Packed Colums," Jul. 2007, AICHE, pp. 28-38.

METHOD OF OPTIMIZING PRODUCT OUTPUT RATE OF PACKED COLUMNS

RELATED APPLICATION

This application is a divisional of U.S. application Ser. No. 12/765,611, filed on Apr. 22, 2010 which claims the benefit of U.S. Provisional Application No. 61/276,098, filed on Sep. 8, 2009.

The entire teachings of the above applications are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Phase transitions in physical systems have been an active area of scientific investigation for many years. Solid/liquid/vapor transitions such as those that occur between ice, water, and steam are undoubtedly familiar examples. Another common example is sugar crystal formation in honey that has been left to stand for a long time. Phase transitions, however, occur in many other types of systems—for example, the transition from ferromagnetic to paramagnetic behavior for ferromagnets at the Curie temperature, or the transition from normal conductivity to superconductivity in certain metals and ceramic oxides at a critical temperature, or the conductor/insulator percolation threshold for electrical networks.

Phase transitions are classified as being either first-order or continuous (or, more infrequently, second-order) phase transitions. First-order transitions such as those between ice, water, and steam, involve the evolution or absorption of heat at the transition point. Continuous transitions, by contrast, are not accompanied by heat transfer. In addition, continuous phase transitions are accompanied by the growth of fluctuations on ever-longer length scales. Transitions are further organized into groupings called universality classes. For systems from the same universality class, renormalizing raw experimental data to the proper critical conditions has the remarkable effect of "collapsing" data onto what is essentially a master curve. FIG. 1 shows two examples of this phenomenon: FIG. 1A demonstrates that pressure/volume/temperature data for several different fluids fall on top of one another when the data are properly renormalized to the critical point; FIG. 1B illustrates that the same type of collapse occurs for ferromagnetic materials near the Curie temperature. See J. M. Yeomans, *The Statistical Mechanics of Phase Transitions*, (1992) p. 28 for FIG. 1A, and p. 119 for FIG. 1B.

Modeling of phase transitions is important for designing distillation columns using random or structured packings. In normal operation, packed columns are operated countercurrently with the vapor as the continuous phase and the liquid as the dispersed phase. These columns can reach points of hydraulic inoperability generally referred to as "flood points." Flooding is typically associated with large fluctuations in the pressure drop, an abrupt increase in the liquid holdup and the pressure drop, and excessive liquid entrainment. Investigators have noted that flooding seems to be associated with a transition from vapor-continuous to liquid-continuous operation. See Eckert, J. S. *New Look at Distillation*-4 *Tower Packings . . . Comparative Performance*, Chem. Eng. Prog. 59 pp. 76-82 (May 1963). FIG. 2 shows the buildup of liquid on the top of a packed column near the flood point.

The pressure drop of a vapor flowing countercurrently upward relative to the liquid flow is illustrated in FIG. 3. For all liquid rates, a zone is reached where the pressure drop breaks upward. Column instability sets in at the points B, B' and reaches a maximum at C, C', where the increase in pressure drop is quite large with only a small increase in the vapor flow rate. Points C and C' are referred to as flood points, and it is here that liquid accumulation on the top of a packed bed usually becomes visually apparent, as illustrated in FIG. 2.

The flooding phenomenon in packed columns is extremely complex. It is possible to operate a column away from flooding in either vapor-continuous or liquid-continuous mode. The crossover from normal vapor-continuous operation to something more akin to operation in a liquid-continuous mode is signaled by the onset of a change in slope of the pressure drop versus vapor velocity from the slope of the curves away from flooding. In FIG. 4, the dashed lines have been drawn with the same slope as the dry (zero liquid flow) pressure drop curve. S. M. Walas, *Chemical Process Equipment: Selection and Design*, Butterworth-Heinemann (2002). At a liquid loading of 20,000 lbs/hr-ft$^2$, the initial slope (between 0.1 and 0.2 "$H_2O$/ft (inches of water per foot of column packing)) is virtually identical to that of the dry pressure drop curve. At 30,000 lbs/hr-ft$^2$, however, the initial slope has become noticeably different, signaling the transition to operation in a liquid-continuous mode.

For maximum product output from a distillation column, it is desirable to operate in vapor-continuous mode (with the gas as the vapor-continuous phase and the liquid as the dispersed phase) at the highest gas and liquid flow rates achievable without flooding the column. To assist in column design, packing manufacturers provide air/water pressure drop data at different liquid flow rates, such as the example shown in FIG. 4. There is a need, however, for a method of generating a unified mathematical expression of pressure drop in a packed column at any liquid flow rate.

SUMMARY OF THE INVENTION

The invention generally is directed to a method of determining a flood point for a packed column at any liquid flow rate, and a method of optimizing a product output rate from a distillation column by determining a pressure drop within the distillation column at a fraction of flood point by using a plot or mathematical expression of pressure drop as a function of fraction of flood point at any liquid flow rate.

The method of determining a flood point for a packed column includes providing a data set of gas pressure drop values as a function of gas flow rate values at several liquid flow rates through a packed column, and a known flood point value for one liquid flow rate. The method then includes setting flood point values for higher liquid flow rates at values lower than the known flood point value, and setting flood point values for lower liquid flow rates at values higher than the known flood point value, followed by expressing gas flow rates for liquid flow rates as fractions of the flood point value for each respective liquid flow rate. At a constant gas pressure drop, the method then includes calculating an average fractional flood point value for the liquid flow rates and minimizing the standard deviation between the fractional flood point value at different liquid flow rates and the calculated average fractional flood point value by iteratively resetting fractional flood point values and recalculating the average fractional flood point value for the liquid flow rates, thus resulting in determining a flood point for the packed column at any liquid flow rate, and thereby producing a plot of pressure drop as a function of fraction of flood point at any liquid flow rate, or a mathematical expression thereof.

In some embodiments, the packed column is operated with the gas as vapor continuous phase and the liquid as dispersed phase. In certain embodiments, the known flood point value for one liquid flow rate equals a gas pressure drop of about one and a half inches of water per foot of column for the gas being air and the liquid being water. In certain other embodiments, the known flood point value for one liquid flow rate equals a gas pressure drop of about two inches of water per foot of column for the gas being air and the liquid being water. In still other embodiments, the known flood point value for one liquid flow rate equals a gas flow rate at which a slope of gas pressure drop as a function of gas flow rate is equal to or greater than about two. Alternatively, the known flood point value for one liquid flow rate can include a user observation of an accumulation of liquid at the top of the column. In some embodiments, the method steps are computer-implemented and output is usable for process modeling.

The method of optimizing a product output rate from a distillation column having a top and a bottom includes setting a desired product output rate from the distillation column, calculating a fraction of flood point of the distillation column at a reflux ratio, and determining a pressure drop within the distillation column at the fraction of flood point. The step of determining the pressure drop employs the method of producing a plot of pressure drop as a function of fraction of flood point at any liquid flow rate, or producing a mathematical expression thereof. The method of optimizing a product output rate from a distillation column then includes calculating a pressure at the bottom of the distillation column for a pressure at the top of the distillation column, calculating the pressure drop within the distillation column of a given length, calculating a temperature corresponding to the calculated pressure at the bottom of the distillation column, and adjusting the desired product output rate or the reflux ratio or the pressure at the top of the distillation column. In some embodiments, the distillation column can be a packed column. The packed column is operated with gas as vapor continuous phase and liquid as dispersed phase.

An advantage of the methods described above is in the development of correlations to predict the pressure drop and approach to flood for a packing material. Instead of three variables—liquid flow rate, vapor (gas) flow rate, and pressure drop—the problem is reduced to one involving only two variables—fractional approach to flood and pressure drop. Then, a mathematical expression can be obtained for a curve fit through the data points. Such an expression can be used, for example, in a computer-implemented column design.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 7:
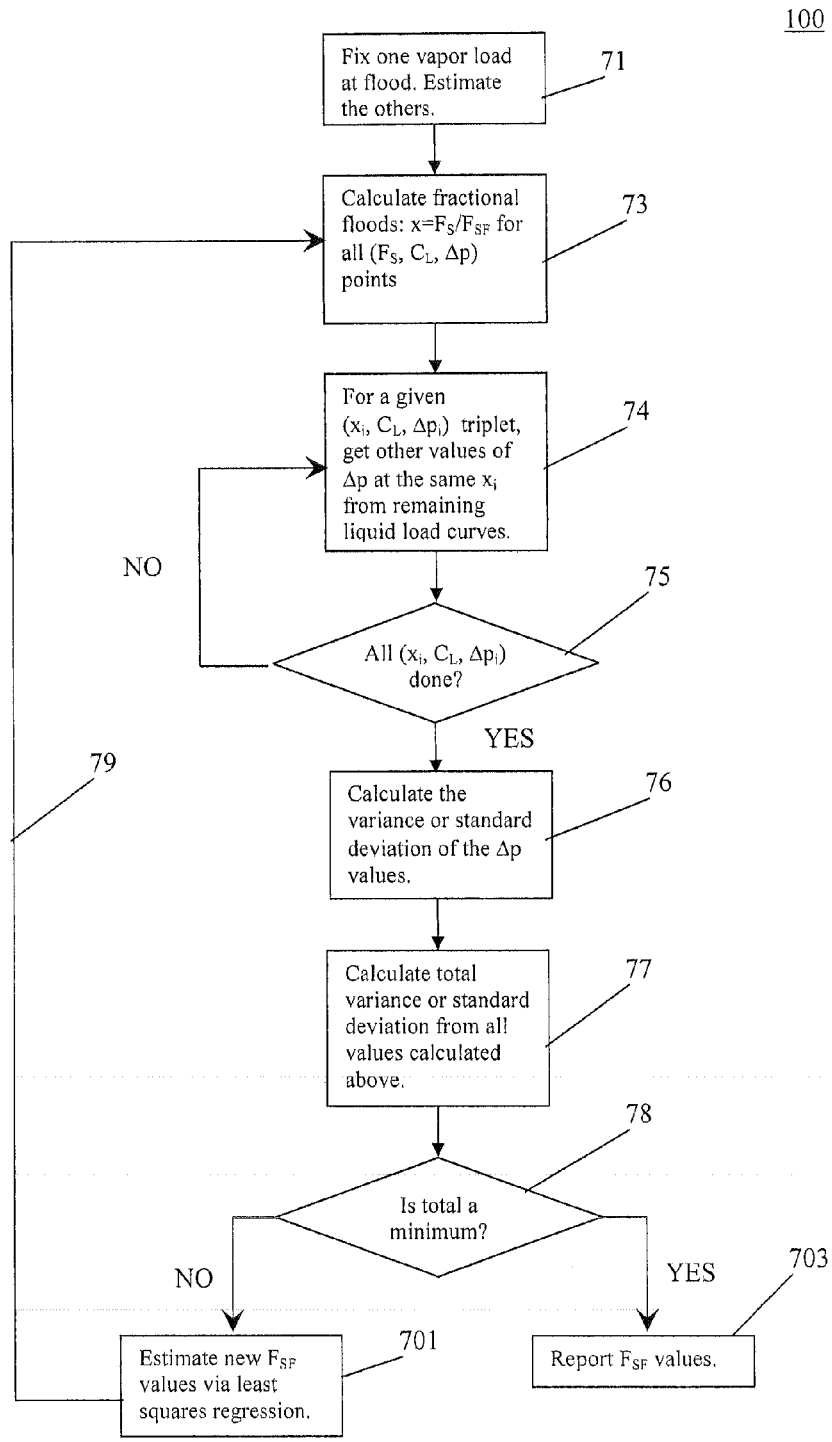
FIG. 7 is a flow chart of the invention method of determining a flood point for the packed column at any liquid flow rate.

A description of example embodiments of the invention follows. Presented in FIG. 7 is a flow diagram of embodiments of the present invention. The following describes and discusses Applicant's approach and method steps.

The invention method 100 of determining a flood point for a packed column includes providing a data set of gas pressure drop values as a function of gas flow rate values at several liquid flow rates through a packed column, and a known flood point value for one liquid flow rate. An example using pressure drop and air/water flow rate data provided by the manufacturer (Koch-Glitsch L P, Wichita, K S) of the IMTP® #50 packing material will be used to illustrate the method 100.

Figure 1A:
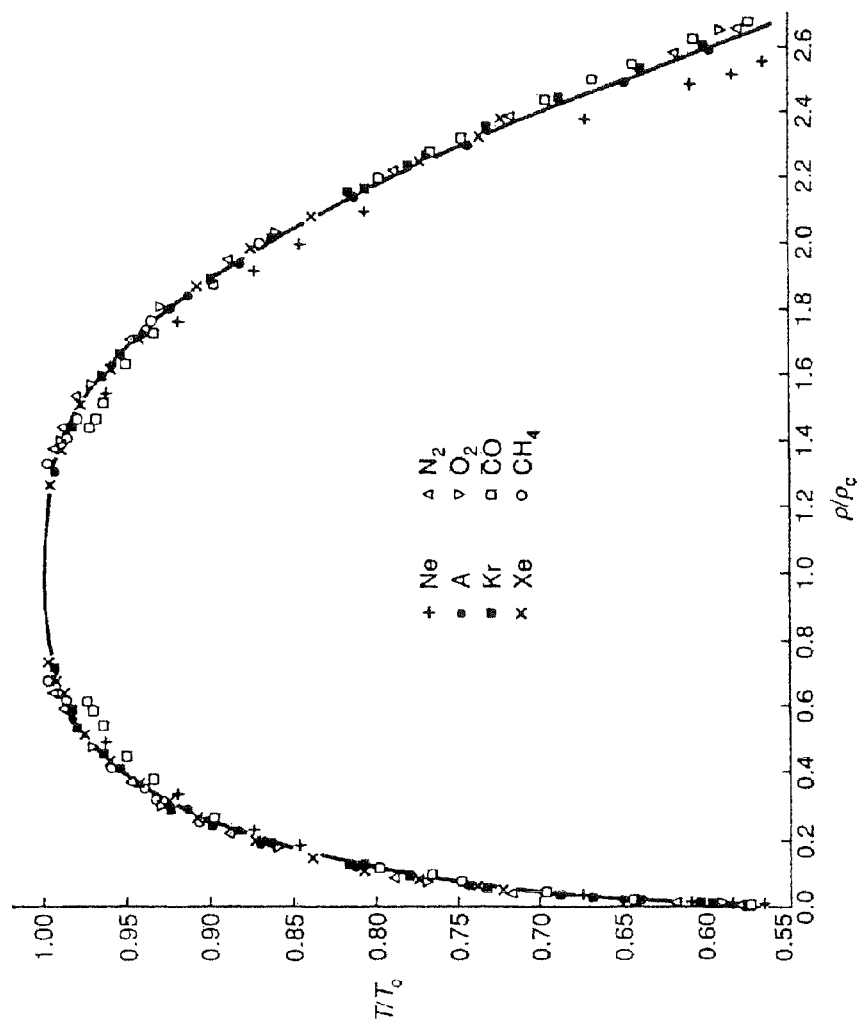
FIGS. 1A-B are graphs of: 1A—pressure/volume/temperature data for several different fluids that can be plotted on one unified curve when the data are properly renormalized to the critical point; 1B—unified curves below and above the Curie temperature for ferromagnetic materials.
Figure 1B:
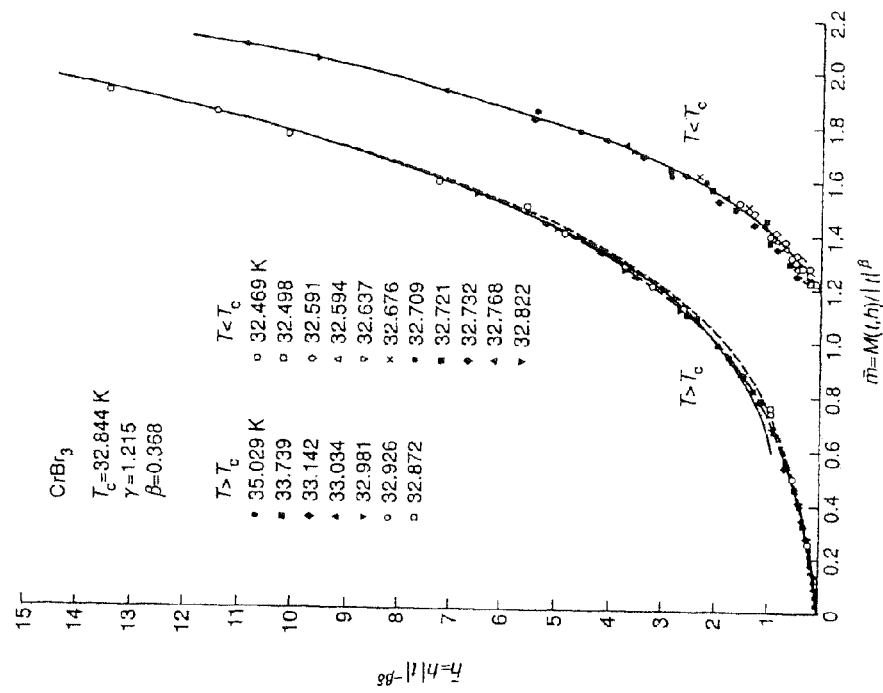
Figure 2:
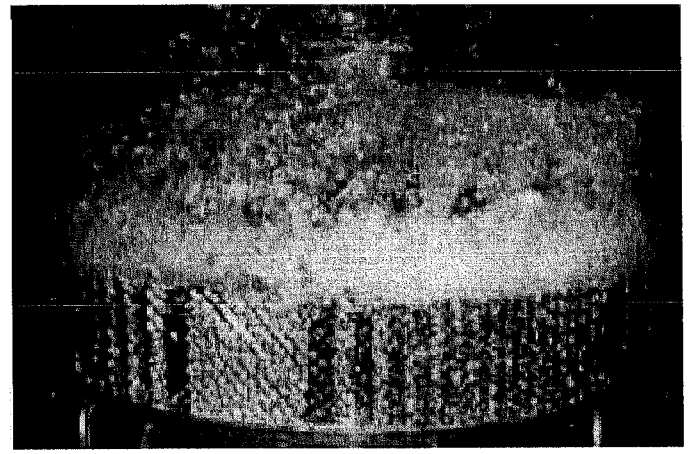
FIG. 2 is a photograph showing severe flooding at the top of a column packed with conventional FLEXIPAC® 1Y packing at a gas flow rate $F_s$ of about 2.2 Pa$^{1/2}$ and a liquid flow rate of about 10 gpm/ft$^2$ (gallons per minute per square foot) (25 m$^3$/(m$^2$ h)).
Figure 3:
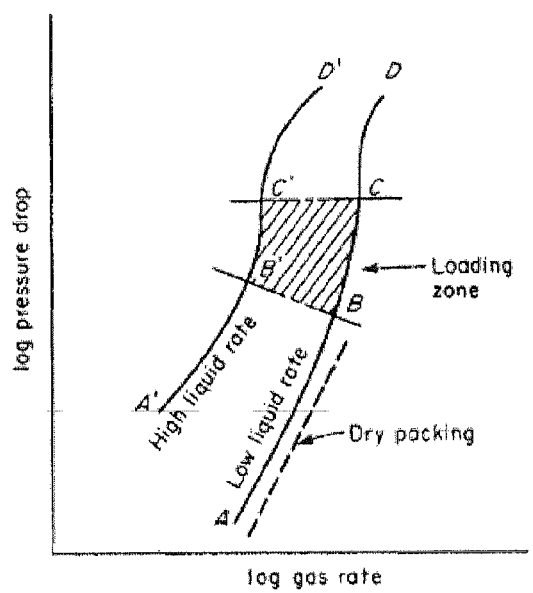
FIG. 3 is a graph of the logarithm of pressure drop as a function of the logarithm of gas flow rate showing flood points for a low liquid flow rate and a high liquid flow rate.
Figure 4:
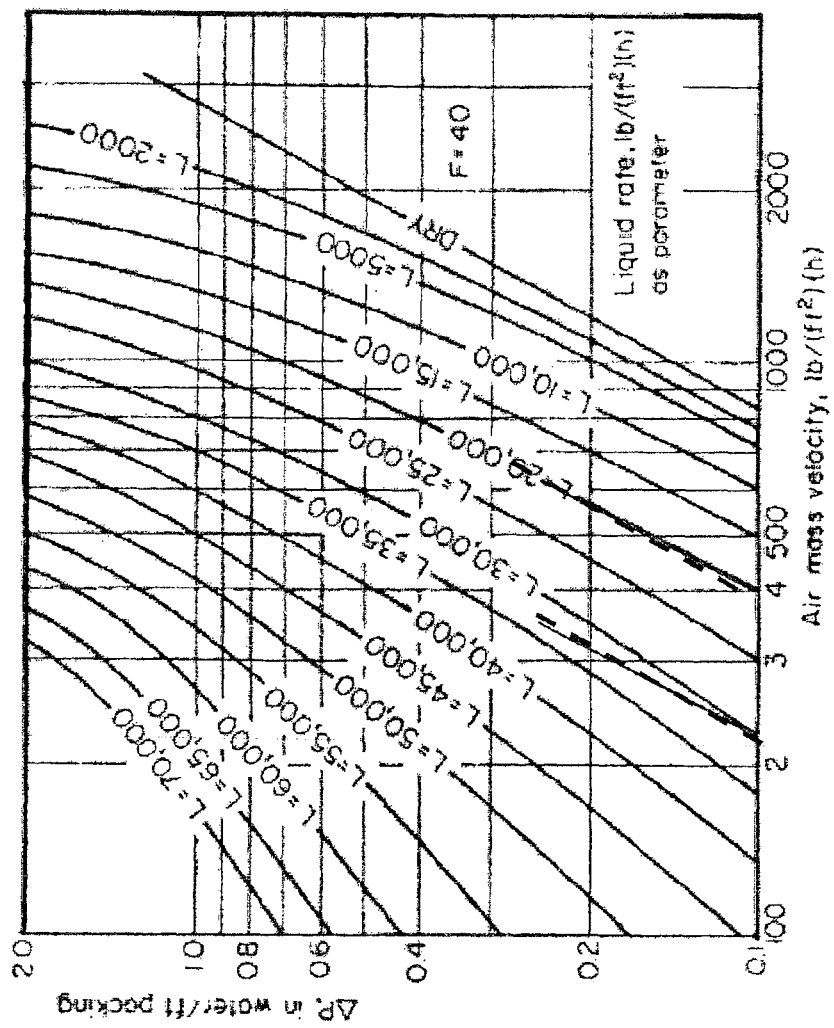
FIG. 4 is a graph of pressure drop as a function of air mass velocity at several liquid flow rates for 2" INTALOX® porcelain saddles with F=40, in a packed bed 30" diameter and 10' high.
Figure 5:
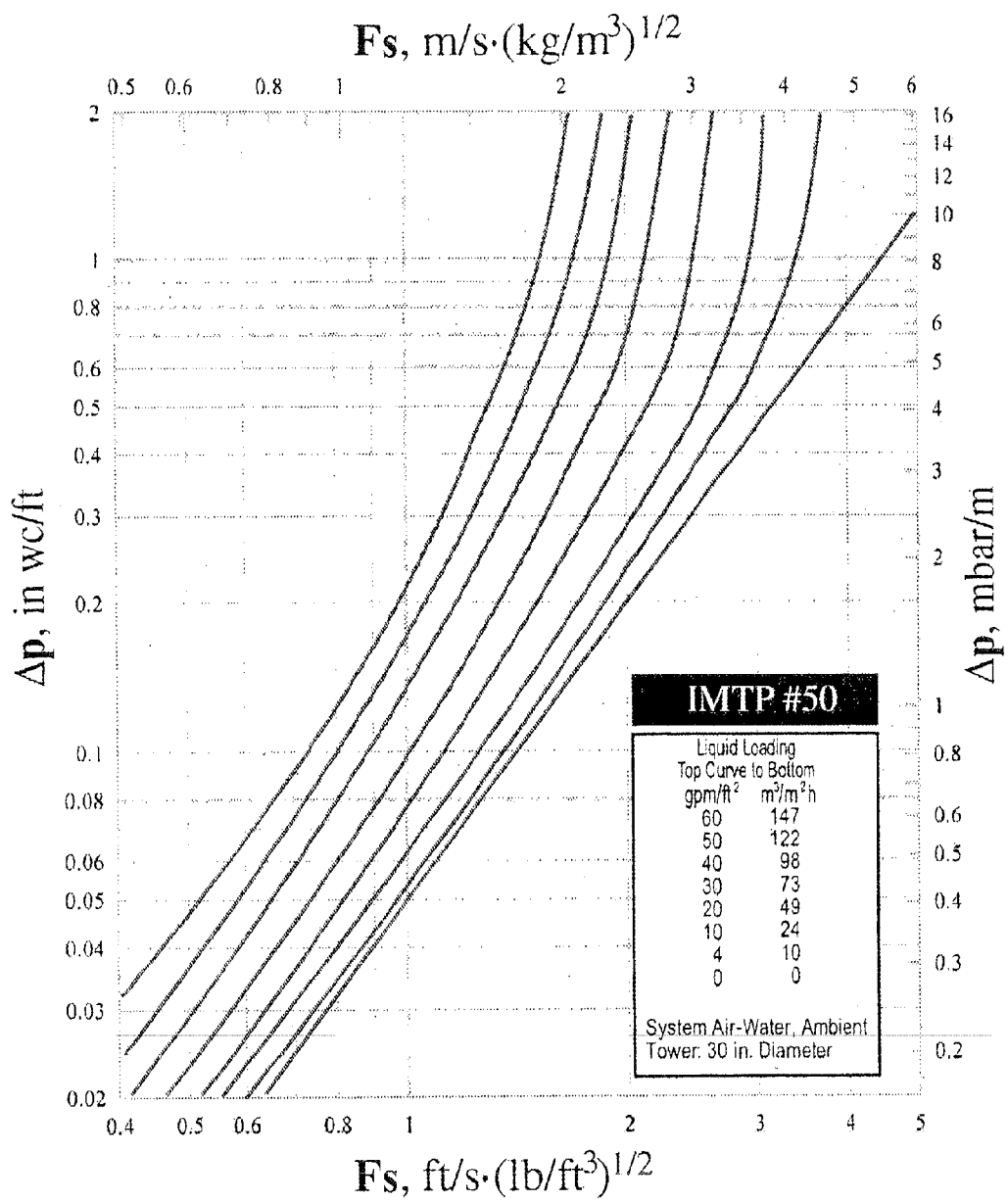
FIG. 5 is a graph of pressure drop as a function of air mass velocity at several water flow rates for IMTP® #50.
Figure 6:
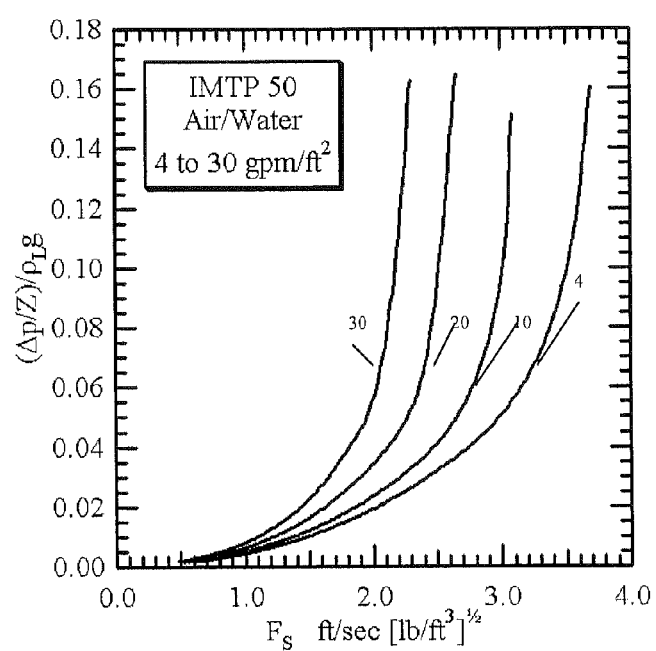
FIG. 6 is a graph of pressure drop in dimensionless units as a function of air mass velocity at several water flow rates for IMTP® #50.

The air/water flow rate data provided by the packing manufacturer is shown in FIG. 5. The data is first converted to a dimensionless pressure drop unit, $(\Delta p/Z)/(\rho_L g)$, where, in SI units, $\Delta p$ is the pressure drop in $(kg/(m \cdot s^2))$, $Z$ is the column length in meters, $\rho_L$ is the density of the liquid (water) in $kg/m^3$, and g is the acceleration due to gravity ($9.8 \text{ m/s}^2$), resulting in the graph shown in FIG. 6. The known flood point value for one liquid flow rate, $F_{SF20}$, for the 20 gpm/ft$^2$ liquid load curve was estimated to be a gas flow rate of 2.66 ft/sec $[lb/ft^3]^{1/2}$, at a pressure drop of 2 inches of water per foot of column length ("H$_2$O/ft), as shown in FIG. 5. Alternatively, the known flood point value for one liquid flow rate can be set at a pressure drop of 1.5 "H$_2$O/ft, or at a gas flow rate at which the slope of gas pressure drop as a function of gas flow rate is equal to or greater than about two, or at a gas flow rate at which a user observes an accumulation of liquid at the top of the column. This value is held fixed at step 71.

The method 100 (step 71) then includes setting flood point values for higher liquid flow rates, such as $F_{SF30}$, at values lower than the known flood point value, and setting flood point values for lower liquid flow rates, such as $F_{SF4}$ and $F_{SF10}$, at values higher than the known flood point value. The initial flood point settings, $F_{SF4}$, $F_{SF10}$, and $F_{SF30}$, for the other curves can be arbitrary (within the setpoint rule), such as, for example, the values at 2" H$_2$O/ft shown in FIG. 5 (about 3.8, 3.1, and 2.3 ft/sec[lb/ft$^3$]$^{1/2}$, for 4, 10, and 30 gpm/ft$^2$, respectively).

Then (at step 73), gas flow rates for liquid flow rates are expressed as fractions, $\chi$, of the flood point value for each respective liquid flow rate as shown in Eq. 1 below.

$$x_4 = \frac{F_{S4}}{F_{SF4}} \quad x_{10} = \frac{F_{S10}}{F_{SF10}} \quad x_{20} = \frac{F_{S20}}{F_{SF20}} \quad x_{30} = \frac{F_{S30}}{F_{SF30}} \tag{1}$$

$$\langle x \rangle = (x_4 + x_{10} + x_{20} + x_{30})/4 \tag{2}$$

$$\sigma = \sqrt{\frac{(x_4 - \langle x \rangle)^2 + (x_{10} - \langle x \rangle)^2 + (x_{20} - \langle x \rangle)^2 + (x_{30} - \langle x \rangle)^2}{3}} \tag{3}$$

At a constant gas pressure drop, the method then includes calculating an average fractional flood point value, $\langle \chi \rangle$, for the liquid flow rates, as shown in Eq. 2 above, and minimizing the standard deviation $\sigma$ between the fractional flood point value at different liquid flow rates and the calculated average fractional flood point value. Steps 74-78 in FIG. 7 are illustrative. The standard deviation is calculated as shown in Eq. 3 above. In practice, the minimization procedure 78, 79 is carried out for all sets of four points at constant pressure drop, for all available data. At least one flooding velocity needs to be fixed at the start of the fit. Least squares can be used (step 701) to perform the optimization by setting the objective function to be zero for all points (the standard deviation or variance should be as close to zero as possible).

The overall procedure 100 as outlined above assumes that constant pressure drop data for several liquid loads are readily available. In terms of raw data this will rarely be true—experiments are usually not performed in a mode wherein pressure drops are held constant while vapor load is varied at constant liquid load. Instead, most experiments, as shown in FIG. 5, hold the liquid load constant while varying the vapor load. Pressure drop is the measured variable. The required constant pressure drop data can be estimated in a number of ways. For example, smooth curves can be drawn through the data and then points at constant pressure drop can be read off the graph. Alternatively, one could incorporate some type of numerical interpolation procedure (linear, cubic spline, or smoothing spline, for example) into the least squares routine 701.

Figure 8:
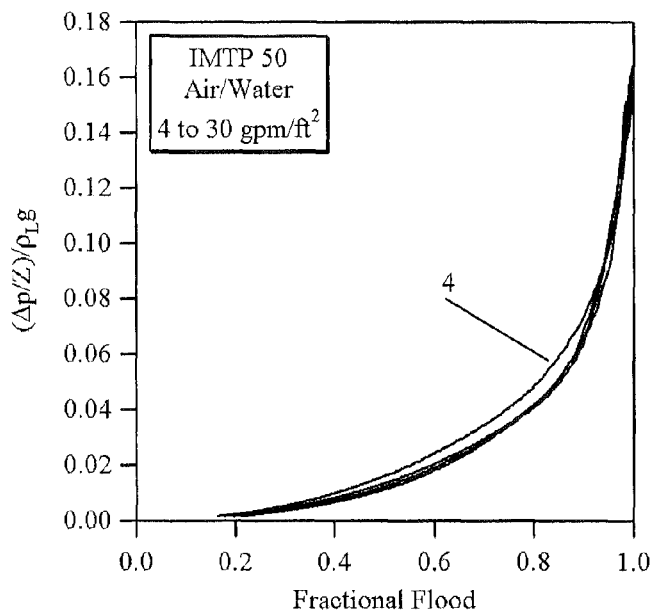
FIG. 8 is a graph of pressure drop in dimensionless units as a function of fractional approach to the flood point for IMTP® #50.

The invention method 100 iteratively resets fractional flood point values (step 701) and recalculates (loop 79) the average fractional flood point value for the liquid flow rates, thus resulting in determining a flood point for the packed column at any liquid flow rate, and thereby producing at 703 a plot of pressure drop as a function of fraction of flood point at any liquid flow rate, or a mathematical expression thereof. The results for flood velocities of IMTP® #50 were:

$F_{S, flood}$ @ 4 gpm/ft$^2$=3.6882 ft/sec[lb/ft$^3$]$^{1/2}$ $F_{S, flood}$ @ 10 gpm/ft$^2$=3.13899 ft/sec[lb/ft$^3$]$^{1/2}$ $F_{S, flood}$ @ 20 gpm/ft$^2$=2.66 ft/sec[lb/ft$^3$]$^{1/2}$ $F_{S, flood}$ @ 30 gpm/ft$^2$=2.30067 ft/sec[lb/ft$^3$]$^{1/2}$ The method 100 described above defines a new criteria for flooding: the appropriate choice of flood points for a given set of packed column pressure drop data is the choice that results in the best possible collapse of the data onto a unified curve. The graph of the air/water pressure drop as a function of fraction of flood point for IMTP® #50 is shown in FIG. 8.

Figure 9:
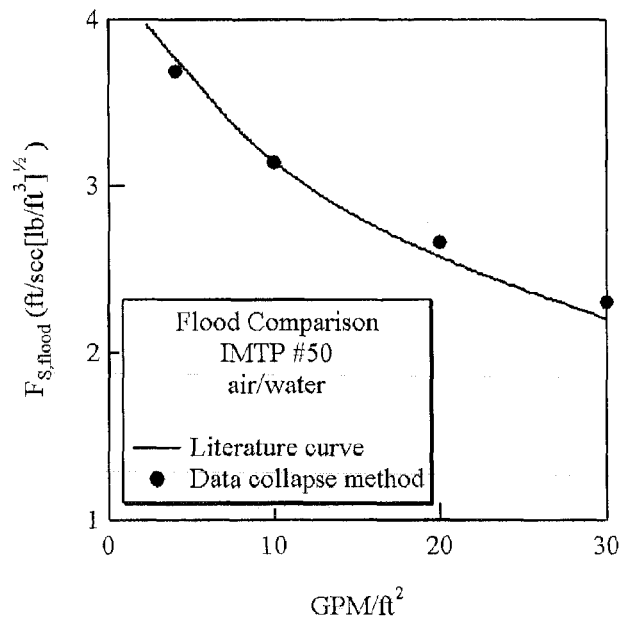
FIG. 9 is a graph of air flow rate at flood point as a function of water flow rate for IMTP® #50.

FIG. 9 compares these estimates to maximum capacity data reported by a vendor of IMTP® #50 (Saint Gobain—Norpro, Akron, Ohio). The agreement between the literature curve and the results obtained above is quite good. Further, the data collapse is also visually quite good. The only curve that noticeably deviates from the others, as indicated in FIG. 8, is the curve for a liquid load of 4 gpm/ft².

Figure 10:
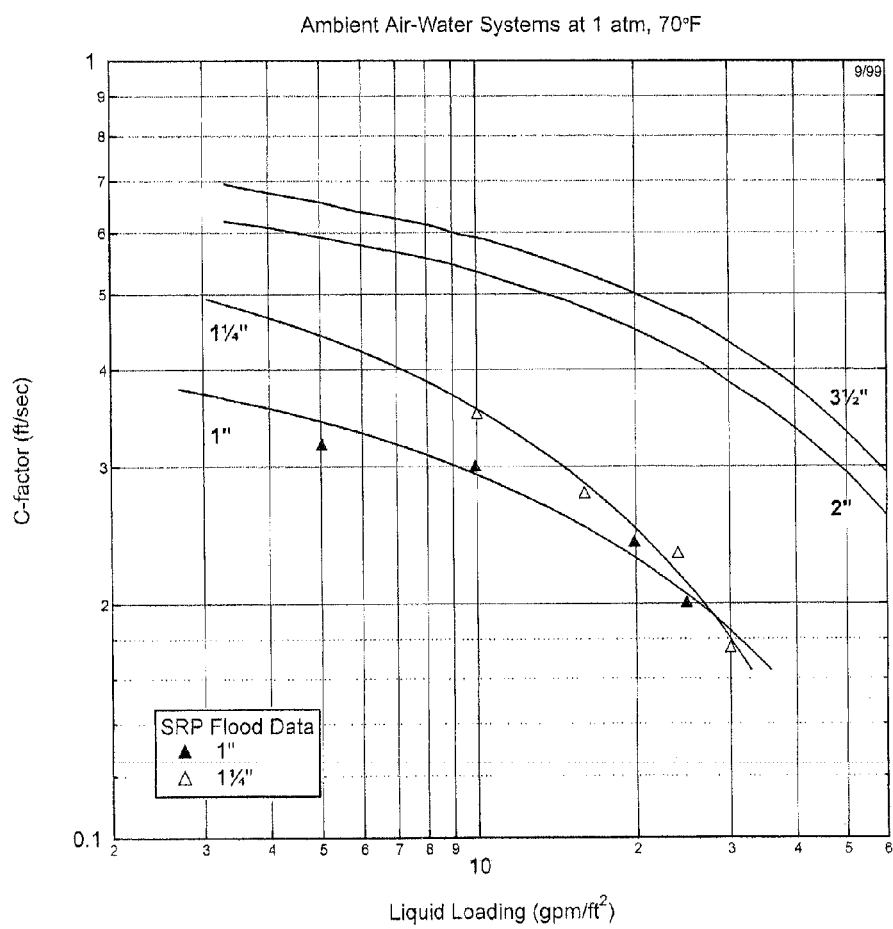
FIG. 10 is a graph of pressure drop as a function of air mass velocity at several water flow rates for plastic Jaeger 2" Tri-Packs®.

Another example of using pressure drop and air/water flow rate data will be used to illustrate that the method 100 described above yields the best unified curve of pressure drop as a function of fraction of flood point, and produces flood point values that are the appropriate choice of flood points that are not necessarily the same values as the conventionally chosen flood point values. The air/water flow rate data for plastic Jaeger 2" Tri-Packs® provided by the packing manufacturer is shown in FIG. 10 (Jaeger Products, Inc., Houston, Tex.). The conversion factor between the C-Factor shown in FIG. 10 and the $F_s$ gas flow rate is $[\rho_L - \rho_v]^{1/2}$, that is $F_s$ is obtained by multiplying the C-Factor value by the square root of the difference between the liquid and vapor densities, $\rho_L$ and $\rho_v$, respectively, that is, $[62.4-0.074]^{1/2}=7.8947$. The flood point value at a liquid flow rate of 30 gpm/ft² was held fixed. The unified pressure drop as a function of fractional flood point obtained by the method described above is shown in FIG. 11. The flood point values at the water flow rates shown in FIGS. 10 (6, 20, 30, and 40 gpm/ft²) obtained by the invention method are listed Table 1, and compared with the values shown in FIG. 10.

TABLE 1

Flood point values for plastic Jaeger 2" Tri-Packs

| Liquid Flow Rate gpm/ft² | Gas Flow Rate at flood point obtained by method of the invention ft/sec[lb/ft³]^{1/2} | Gas Flow Rate at flood point ft/sec[lb/ft³]^{1/2} from Jaeger graph | C-Factor at flood point ft/sec from Jaeger graph |
|---|---|---|---|
| 6 | 4.029 | 4.6 | 0.58 |
| 20 | 3.453 | 3.5 | 0.46 |
| 30 | 3.0 | 3.0 | 0.39 |
| 40 | 2.682 | 2.6 | 0.35 |

Table 1 shows that the flood point values obtained by the method of the invention are significantly different from the conventionally obtained values, particularly at lower liquid flow rates. In particular, the results shown in Table 1 indicate that at a low liquid flow rate (e.g., 6 gpm/ft²) the column will flood at a lower gas flow rate than expected, which could have negative consequences for column operation. By contrast, at high liquid flow rates (e.g., 40 gpm/ft²), the column output could be increased about 3% before flooding, a potentially significant increase in capacity.

Figure 11:
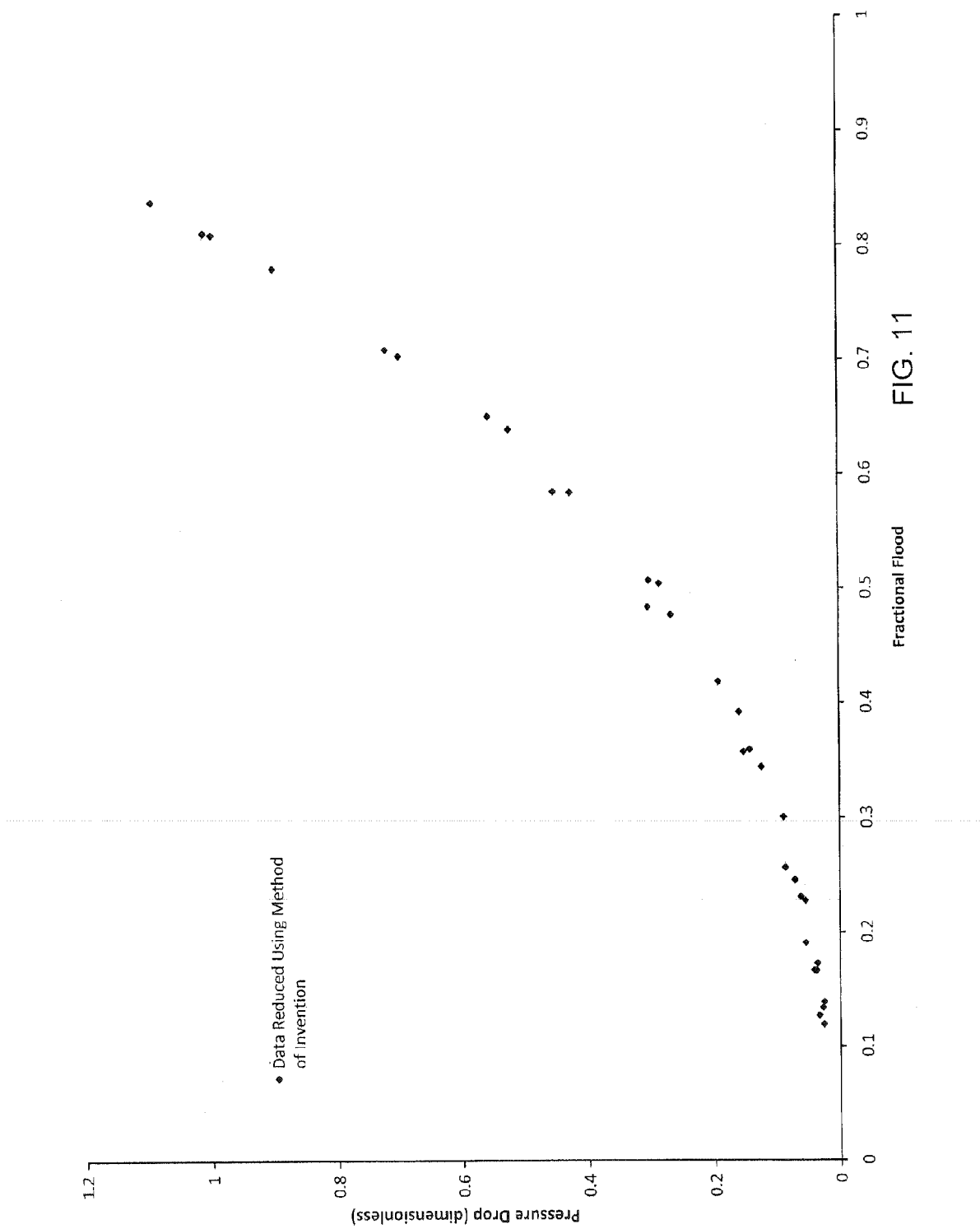
FIG. 11 is a graph of pressure drop in dimensionless units as a function of fractional approach to the flood point for plastic Jaeger 2" Tri-Packs® obtained by methods of the invention.
Figure 12:
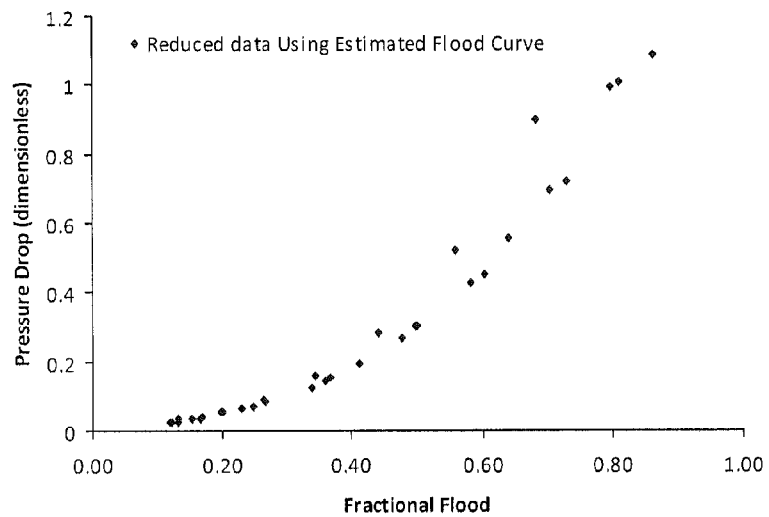
FIG. 12 is a graph of pressure drop in dimensionless units as a function of fractional approach to the flood point for plastic Jaeger 2" Tri-Packs® obtained by using flood points shown in FIG. 10.
Figure 13:
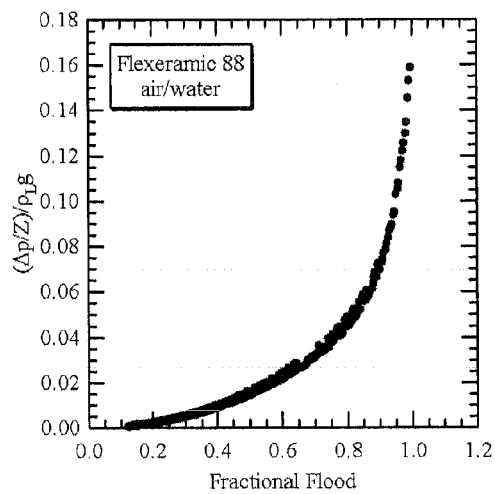
FIG. 13 is a graph of pressure drop in dimensionless units as a function of fractional approach to the flood point for FLEXERAMIC® 88.
Figure 14:
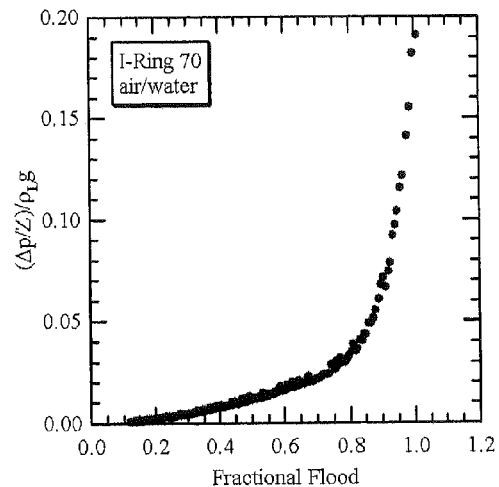
FIG. 14 is a graph of pressure drop in dimensionless units as a function of fractional approach to the flood point for I-Ring™ 70.
Figure 15:
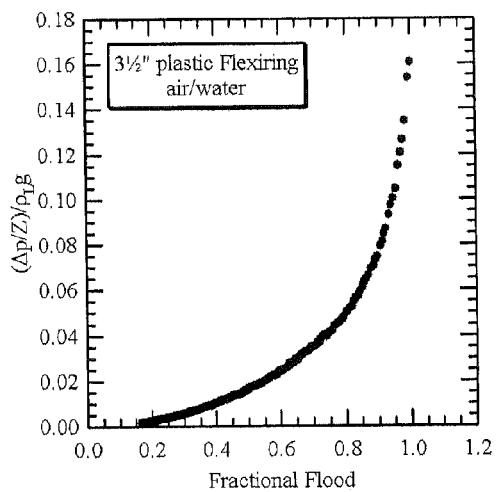
FIG. 15 is a graph of pressure drop in dimensionless units as a function of fractional approach to the flood point for 3.5" plastic FLEXIRING®.
Figure 16:
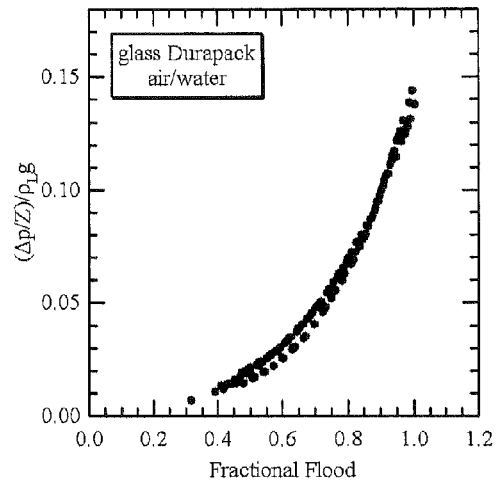
FIG. 16 is a graph of pressure drop in dimensionless units as a function of fractional approach to the flood point for glass DURAPAK®.
Figure 17:
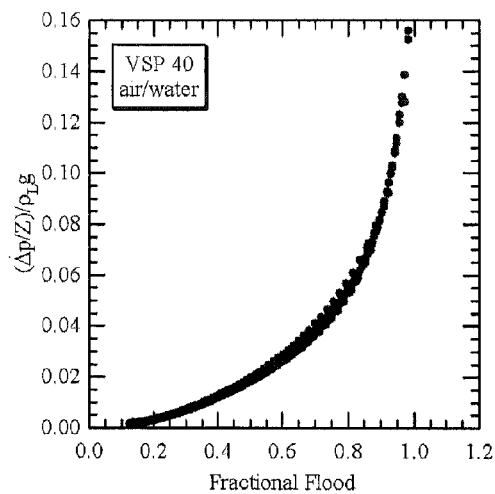
FIG. 17 is a graph of pressure drop in dimensionless units as a function of fractional approach to the flood point for VSP 40.
Figure 18:
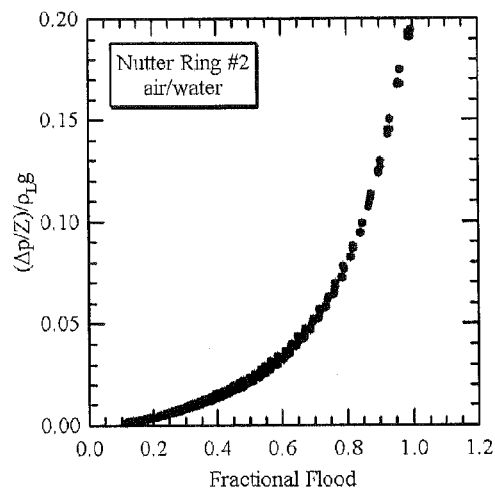
FIG. 18 is a graph of pressure drop in dimensionless units as a function of fractional approach to the flood point for Nutter Ring #2.
Figure 19:
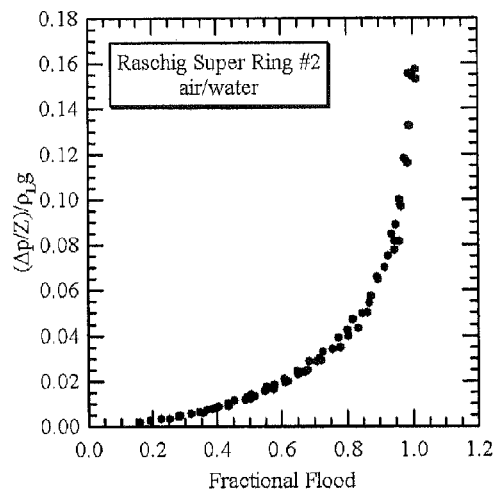
FIG. 19 is a graph of pressure drop in dimensionless units as a function of fractional approach to the flood point for Raschig Super Ring #2.
Figure 20:
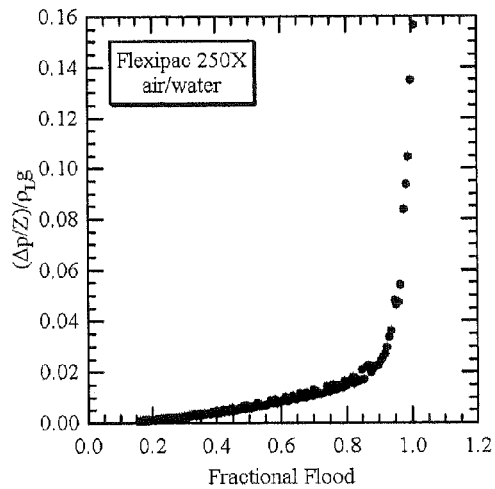
FIG. 20 is a graph of pressure drop in dimensionless units as a function of fractional approach to the flood point for FLEXIPAC® 250X.
Figure 21:
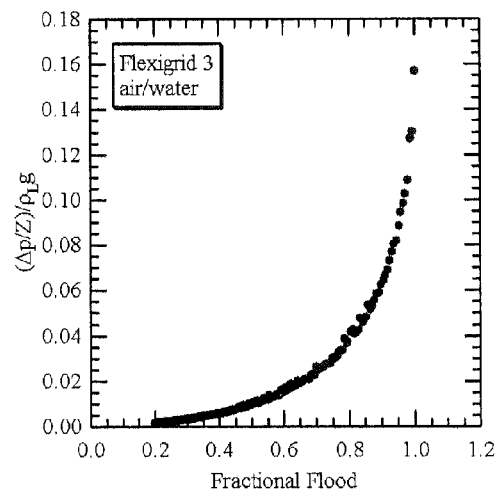
FIG. 21 is a graph of pressure drop in dimensionless units as a function of fractional approach to the flood point for FLEXIGRID® 3.
Figure 22:
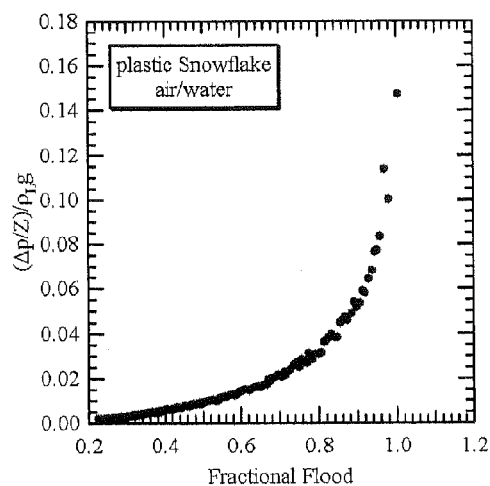
FIG. 22 is a graph of pressure drop in dimensionless units as a function of fractional approach to the flood point for plastic Snowflake.

FIG. 12 shows the unified data obtained by using the manufacturer's flood points listed in Table 1, that is, without using the minimization of the standard deviation described above in steps 78, and 79 of FIG. 7. It can be seen from comparing FIGS. 11 and 12 that the flood point values obtained by the method 100 of the invention produce a better unified curve of pressure drop as a function of fractional flood than the conventional flood point values.

Figure 23:
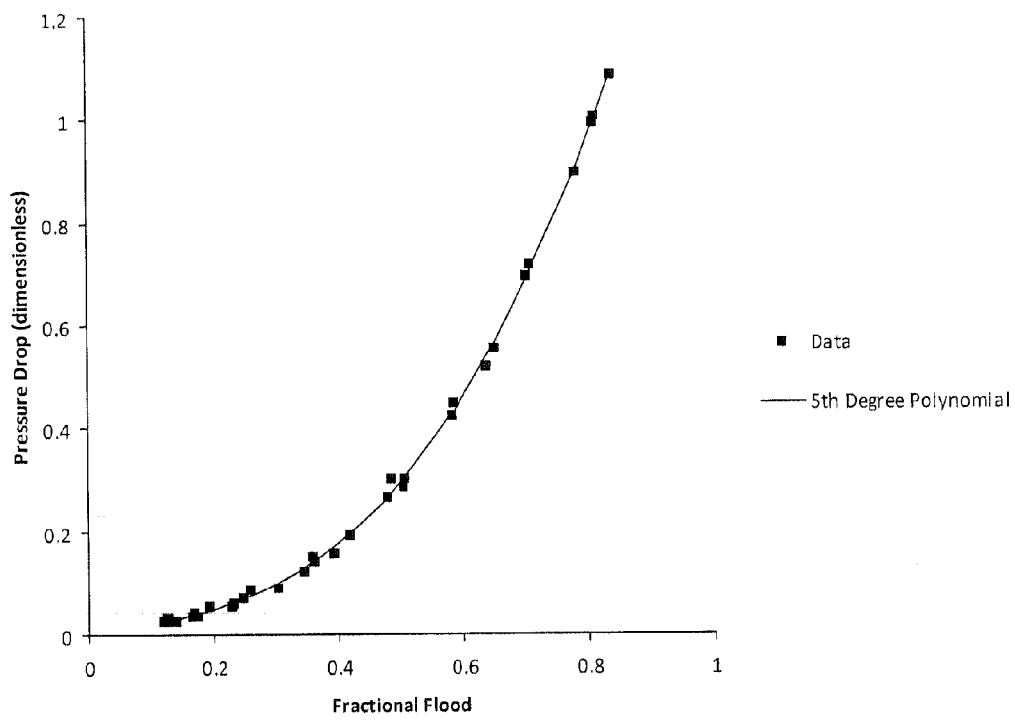
FIG. 23 is a graph of pressure drop in dimensionless units as a function of fractional approach to the flood point for plastic Jaeger 2" Tri-Packs® obtained by methods of the invention and a curve fit to a fifth degree polynomial.

FIGS. 13-22 show several other examples of unified pressure drop data as a function of fractional flood point for a variety of packing styles from a number of different vendors. It is important to note that carrying out the data collapse procedure described above did not require any assumption of a functional form for the pressure drop versus gas/liquid flow rate data. The advantage of this data collapse procedure is in the development of correlations to predict the pressure drop and approach to flood for a packing material. Instead of having to deal with three variables—liquid loading, vapor loading, and pressure drop—the problem is reduced to one involving only two variables—approach to flood and pressure drop. Then, a mathematical expression can be obtained for a curve fit through the points, such as, for example, a fifth order polynomial as shown in FIG. 23, where the data shown in FIG. 11 is fit to a mathematical expression of the form $$y=-1.6555x^5+3.6262x^4-1.4727x^3+1.2596x^2-0.0533x+0.0161 \quad 0\le x\le 1 \quad (4)$$

where x is the fractional flood at constant liquid load and y is the dimensionless pressure drop. Such an expression can be used in a computer-implemented column design and process modeling enabled by the present invention.

Figure 24:
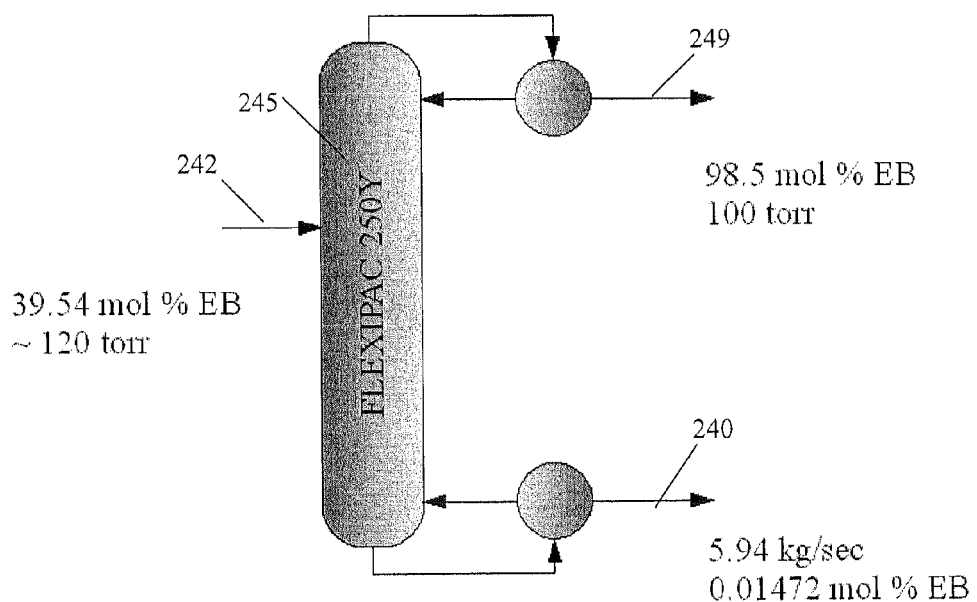
FIG. 24 is an illustration of the input/output streams for a distillation column.

The method of the present invention for optimizing a product output rate from a distillation column having a top and a bottom includes setting a desired product output rate from the distillation column. An example involving the separation of ethylbenzene from styrene monomer will be used to illustrate the method with reference to FIG. 24. A desired production rate (output 240) of styrene monomer is about 5.94 kg/sec (about 21,384 kg/hr). The feed (input 242) stream entering the distillation column 245 at about 120 torr contains 39.54 mol % ethylbenzene (EB) ($C_6H_5CH_2CH_3$ 106 grams/mol) and styrene monomer ($C_6H_5CHCH_2$ 104 grams/mol). The desired composition of the separated distillate streams (outputs 249 and 240) is a vapor stream 249 that is 98.5 mol % EB exiting the top of the column 245 at a pressure of about 100 torr, and a liquid stream 240 of styrene monomer that contains 0.01472 mol % EB or less exiting the bottom of the column 245. Styrene monomer thermally polymerizes to polystyrene at a temperature above 100° C., and therefore the temperature, and consequently the pressure, must be maintained at a level that minimizes styrene losses due to polymerization. The column packing is FLEXIPAC® 250Y structured packing.

The pressure P is related to the temperature T by Eq. 5:

$$\log P = A - \frac{B}{T+C} - \log(760) \quad T \text{ in } °C. \quad P \text{ in atm} \quad (5)$$

where the A, B, and C coefficients are listed in Table 2 below.

TABLE 2

Coefficients for Eq. 5

|  | A | B | C |
|---|---|---|---|
| ethylbenzene | 6.95719 | 1424.255 | 213.206 |
| styrene | 6.92409 | 1420.0 | 206 |

Eq. 5 can be rearranged to obtain the temperature T as a function of pressure P as:

$$T = \frac{B}{A - \log(P) - \log(760)} - C \quad T \, °C. \quad P \text{ atm} \quad (6)$$

The vapor density can be obtained from Eq. (6) as:

$$\rho_v = \frac{12.1877 \cdot P \cdot M}{\frac{B}{A - \log P - \log(760)} - C + 273.15} \quad P \text{ atm } M \text{ grams/mol} \quad (7)$$

Figure 25:
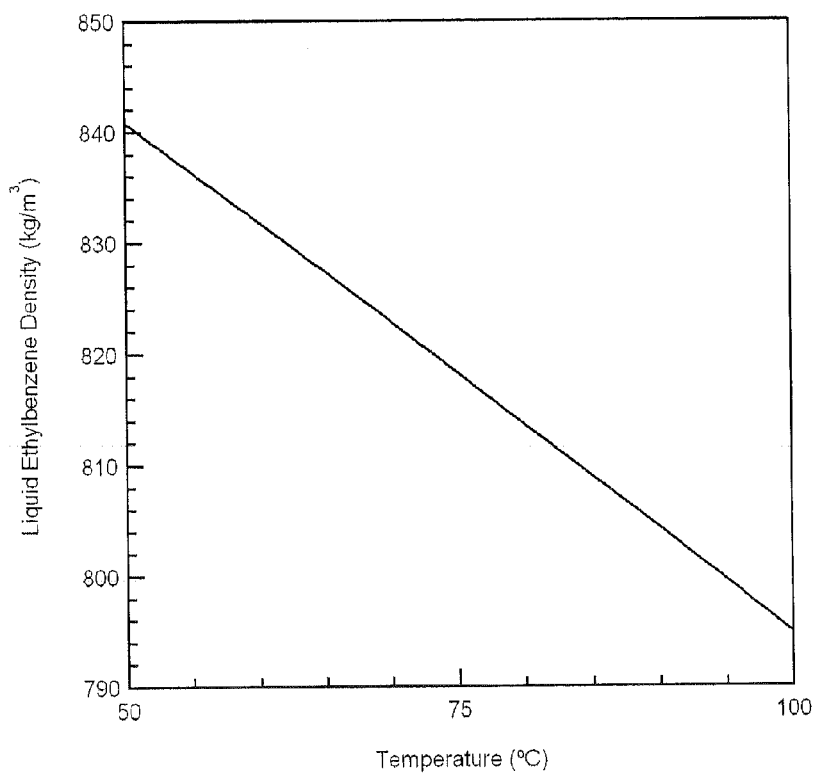
FIG. 25 is a graph of liquid ethylbenzene density as a function of temperature.
Figure 26:
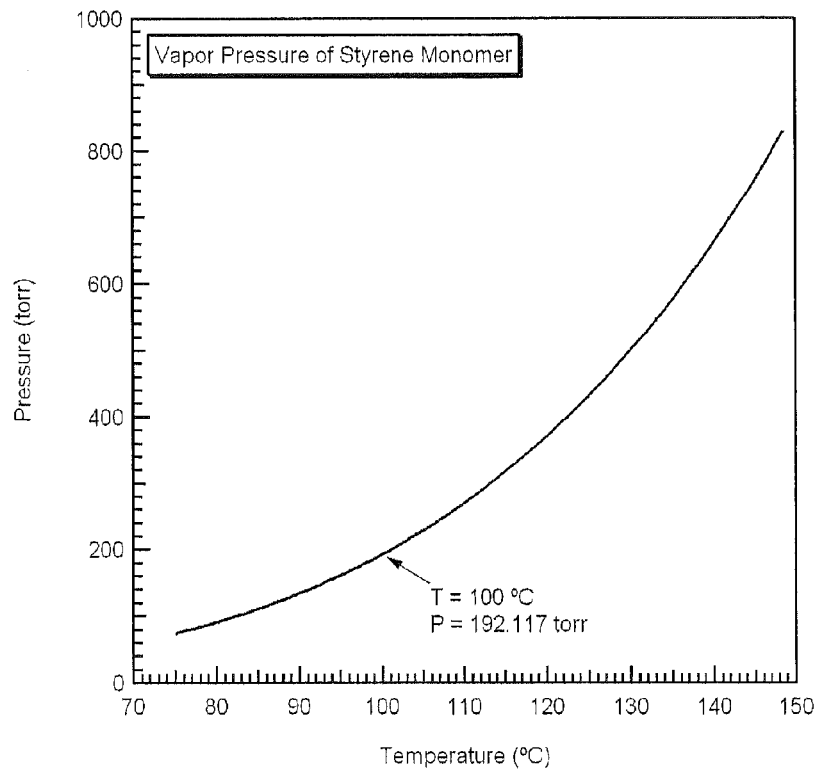
FIG. 26 is graph of pressure as a function of temperature for styrene monomer.

For a pressure of 100 torr and a composition of almost entirely ethylbenzene at the top of the column 245, the EB vapor density is equal to 0.4895 kg/m³, at a temperature of 74.1° C. The corresponding liquid ethylbenzene density at that temperature is obtained from FIG. 25, as approximately 818 kg/m³. Data for FIG. 25 was obtained from Lange's *Handbook of Chemistry*, 11$^{th}$ Edition (1973). The bottom product stream 240 is almost entirely styrene monomer. The temperature of styrene monomer as a function of vapor pressure, calculated using Eq. 5, is shown in FIG. 26. The plot shown in FIG. 26, given that the temperature at the bottom of the column 245 must be 100° C. or less, yields a maximum vapor pressure of about 192 torr.

Figure 27:
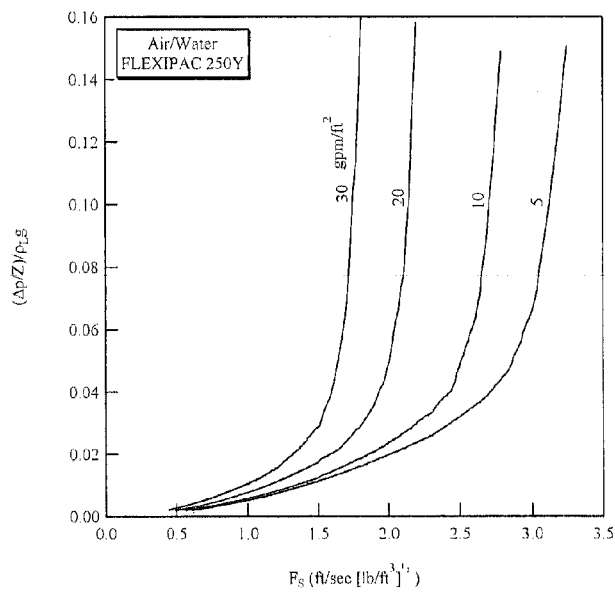
FIG. 27 is a graph of pressure drop as a function of air mass velocity at several water flow rates for FLEXIPAC® 250Y.

The step 74 (FIG. 7) of determining the pressure drop employs the method of producing a plot of pressure drop as a function of fraction of flood point at any liquid flow rate, or producing a mathematical expression thereof. Air/Water pressure drop and flow rate data for Flexipac 250Y at four liquid flow rates are shown in FIG. 27. This data can be collapsed to a unified curve by the method 100 of producing a plot of pressure drop as a function of fraction of flood point at any liquid flow rate described above and shown in FIG. 7 to yield the graph shown in FIG. 28. The gas flow rates at flood point corresponding to the four liquid flow rates of FIG. 27 obtained by the invention method 100 are listed in Table 3.

TABLE 3

Flood Points of Flexipac 250Y Packing Material

| Liquid Load in gpm/ft² - $C_{LF}$ | Liquid Load in m/sec - $C_{LF}$ | Vapor Load in Pa$^{1/2}$ - $F_{SF}$ | Vapor Load in m/sec - $C_{SF}$ |
|---|---|---|---|
| 5 | 0.01114 | 3.9415 | 0.12484 |
| 10 | 0.02228 | 3.4143 | 0.10814 |
| 20 | 0.04456 | 2.6912 | 0.08524 |
| 30 | 0.06684 | 2.2086 | 0.06995 |

Figure 29:
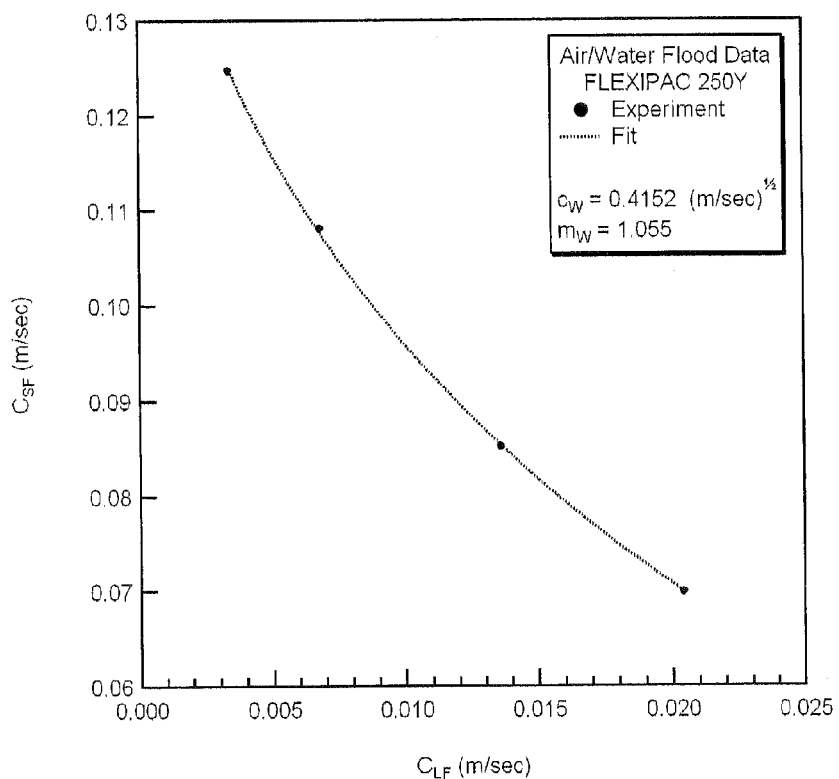
FIG. 29 is a graph of gas flow rate as a function of liquid flow rate at flood point for FLEXIPAC 250Y.

The four data points in Table 3 were fit to the Wallis equation $$\sqrt{C_{SF}} + m\sqrt{C_{LF}} = c \qquad (8)$$

where $C_{SF}$ is the gas flow rate and $C_{LF}$ is the liquid flow rate at the flood point. The following correlation parameters were obtained for air/water: $c_W$=0.4152 (m/sec)$^{1/2}$, $m_W$=1.055. The fit and data points are shown in FIG. 29. The values for $c_w$ and $m_w$ can be corrected for the physical properties of the ethylbenzene/styrene system (as compared to air/water), but the correction is relatively small (less than about 10%). See B. Hanley, et al., AIChE Annual Meeting, Reno, Nev., November, 2001.

Figure 30:
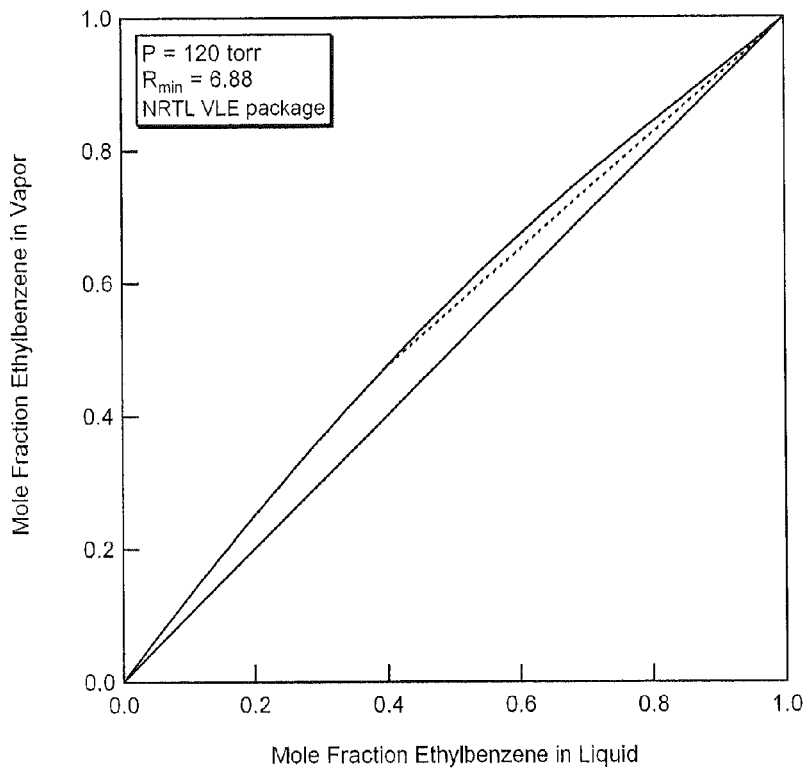
FIG. 30 is a graph of mole fraction ethylbenzene in vapor as a function of mole fraction of ethylbenzene in liquid.
Figure 31:
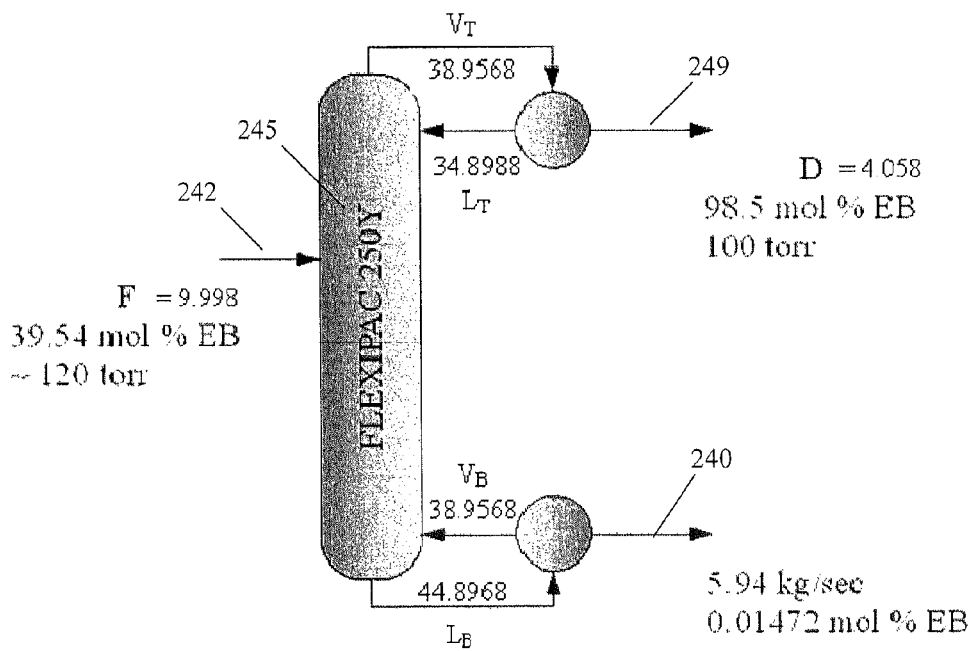
FIG. 31 is an illustration of a material balance for a distillation column.

Eq. 8 is then used to calculate a fraction of flood point of the distillation column at a reflux ratio assuming a constant molal overflow to complete a material balance around the column. The minimum reflux ratio $R_{min}$ can be obtained from the McCabe-Thiele diagram shown in FIG. 30, that was produced using thermodynamics modeling software, such as, for example, Aspen Plus® (Aspen Technology, Burlington Mass.). The column 245 input and output streams 240, 242, and 249 are shown in FIG. 31. Turning to FIG. 30, the dashed line is the operating line for the process, which connects the point on the y-x phase diagram that represents the input stream at 0.395 mol % EB to the point that represents the output stream at 0.985 mol % EB. The slope of the dashed line is equal to 0.873. The minimum reflux ratio is obtained from Eq. 9 as $$\text{slope} = \frac{R_{min}}{1 + R_{min}} \qquad (9)$$

Figure 32:
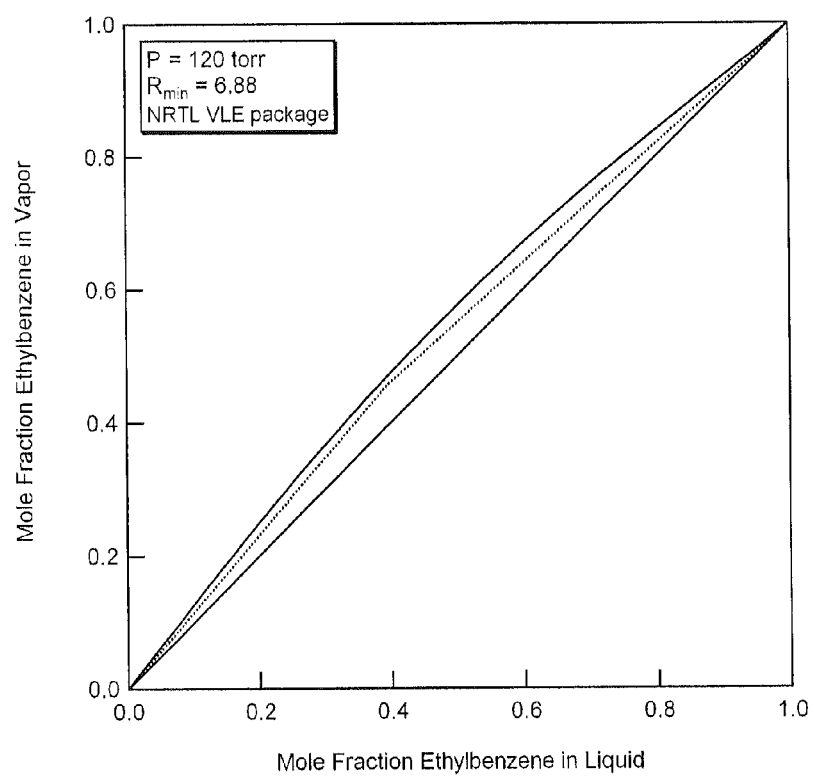
FIG. 32 is a graph of mole fraction ethylbenzene in vapor as a function of mole fraction of ethylbenzene in liquid.

Solving Eq. 9 for $R_{min}$ yields a minimum reflux ratio of 6.88. Using the typical approximation that an acceptable reflux ratio is approximately 125% of $R_{min}$ yields a reflux ratio R=8.6. The McCabe-Thiele diagram for this separation is shown in FIG. 32.

Turning back to FIG. 31, a complete material balance around the column 245 is obtained by simultaneously solving Eqs. 10 and 11 below to calculate the feed rate F to the column and the distillate rate D at the top of the column as $$F = D + 5.94 \qquad (10)$$

$$0.4F = 0.98528D + (150 \times 10^{-6})(5.94) \qquad (11)$$

where the mol % compositions have been converted to weight % for the purposes of this calculation. The results are F=9.998 kg/sec and D=4.058 kg/sec. The internal flows to and from the column 245 can now be estimated. By definition, the liquid rate returning to the top of the column 245 is $$L_T = R \cdot D = (8.6)(4.058) = 34.8988 \text{ kg/sec} \qquad (11)$$

A mass balance around the top condenser shows that $$V_T = L_T + D = 34.8988 + 4.058 = 38.9568 \text{ kg/sec} \qquad (12)$$

Since the feed 242 is assumed to be all liquid at its bubble point, the liquid rate exiting the column 245 must be the liquid rate at the top of the column plus the feed rate $$L_B = L_T + F = 9.998 + 38.9568 = 44.8968 \text{ kg/sec} \qquad (13)$$

A mass balance around the bottom reboiler yields $$V_B = L_B - B = 44.8968 - 5.94 = 38.9568 \text{ kg/sec}$$

Figure 33:
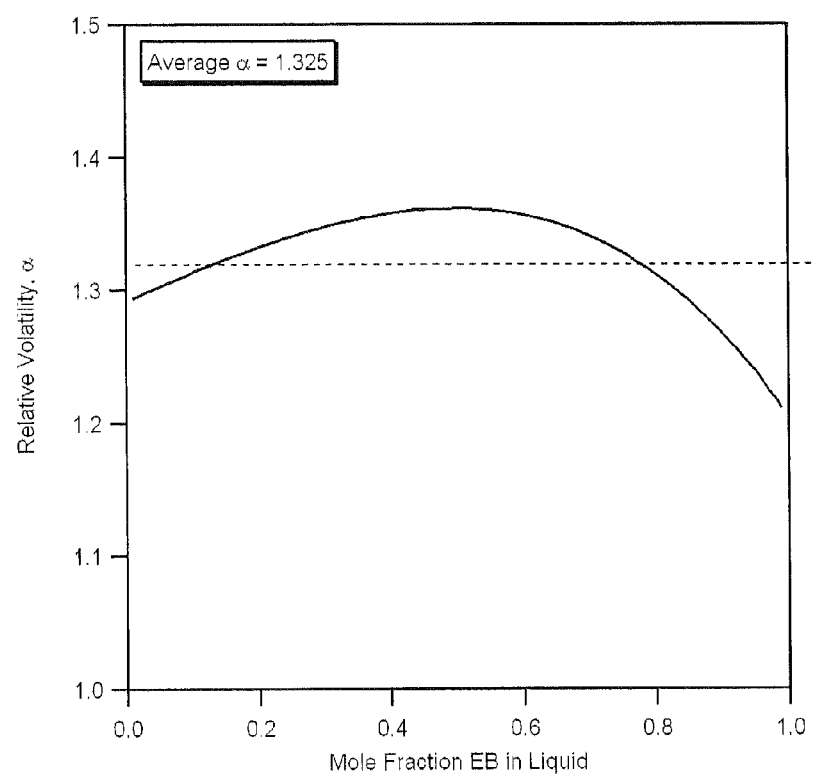
FIG. 33 is a graph of relative volatility as a function of mole fraction ethylbenzene in liquid.

The height of the column 245 is obtained by using Smoker's equation to calculate the number of theoretical stages required. Smoker's equation is strictly valid for systems with a constant relative volatility, $\alpha$. The relative volatility for ethylbenzene relative to styrene does not vary greatly with composition, as shown in FIG. 33. Using an average $\alpha$ of 1.325, indicated by the dashed line in FIG. 33, Smoker's equation for the rectifying (top) section of the column is $$m_T(\alpha-1)k_T^2 + [m_T + b_T(\alpha-1) - \alpha]k_T + b_T = 0 \qquad (14)$$

where $$m_T = \frac{R}{R+1} \quad b_T = \frac{x_D}{R+1} \quad c_T = 1 + (\alpha-1)k_T$$

$$N_T + 1 = \frac{\log\left\{\frac{(x_D - k_T)\left(1 - \frac{m_T c_T(\alpha-1)(x_F - k_T)}{\alpha - m_T c_T^2}\right)}{(x_F - k_T)\left(1 - \frac{m_T c_T(\alpha-1)(x_D - k_T)}{\alpha - m_T c_T^2}\right)}\right\}}{\log\left(\frac{\alpha}{m_T c_T^2}\right)}$$

Smoker's equation for the stripping (bottom) section of the column 245 is $$m_B(\alpha-1)k_B^2 + [m_B + b_B(\alpha-1) - \alpha]k_B + b_B = 0 \qquad (15)$$

where

-continued $$m_B = \frac{Rx_F + x_D - (R+1)x_B}{(R+1)(x_F - x_B)}$$

$$b_B = \frac{(x_F - x_D)x_B}{(R+1)(x_F - x_B)}$$

$$c_B = 1 + (\alpha - 1)k_B$$

$$N_B + 1 = \frac{\log\left\{\frac{(x_F - k_B)\left(1 - \frac{m_B c_B(\alpha-1)(x_B - k_B)}{\alpha - m_B c_B^2}\right)}{(x_B - k_B)\left(1 - \frac{m_B c_B(\alpha-1)(x_F - k_B)}{\alpha - m_B c_B^2}\right)}\right\}}{\log\left(\frac{\alpha}{m_B c_B^2}\right)}$$

Solving Eqs. 14 and 15 yields $N_T=31.687$ and $N_B=67.021$. The height equivalent to a theoretical plate (HETP) has been reported to be approximately 18" (0.4572 m) for FLEXIPAC® 250Y in ethylbenzene/styrene service. See L. Spiegel, *Improving Styrene Separation using MELLAPAKPLUS®*, EFCE Working Party, May 6, 2003, Helsinki Therefore, the depth of the packing Z can be estimated to be $$Z = (N_T + N_B)(0.4572) = (98.708)(0.4572) \approx 45 \text{ meters} \quad (16)$$

In order to minimize cost and size, columns are normally run at about 80% of flood (at constant L/V), and therefore the column diameter will be estimated based on this criterion. In the great majority of cases columns first flood at the top. Therefore the diameter will be computed using conditions at the top of the column.

$$\sqrt{C_{SF}} + m\sqrt{XC_{SF}} = c \quad (17)$$

$$\sqrt{C_{SF}}(1 + m\sqrt{X}) = c$$

$$C_{SF} = \frac{c^2}{(1 + m\sqrt{X})^2}$$

$$C_S = \frac{V_T}{\rho_V\left(\frac{\pi D_c^2}{4}\right)}\sqrt{\frac{\rho_V}{\rho_L - \rho_V}}$$

$$\frac{C_S}{C_{SF}} = \frac{\frac{V_T}{\rho_V\left(\frac{\pi D_c^2}{4}\right)}\sqrt{\frac{\rho_V}{\rho_L - \rho_V}}}{\frac{c^2}{(1 + m\sqrt{X})^2}} = \frac{\frac{2.47827}{D_c^2}}{\left(\frac{0.4152}{(1 + 1.055\sqrt{0.021925})}\right)^2} = 0.8$$

Solution of Eq. 17 yields $$D_c = 4.901 \text{ m} \approx 4.9 \text{ m}$$

The top of the column is operating at 80% of flood point (constant L/V). To determine the pressure drop at the top of the distillation column 245 at the fraction of flood point, the approach to flood point at constant liquid load is calculated from $$\sqrt{C_{SF}} + m\sqrt{C_{LF}} = c \quad (18)$$

$$C_{SF} = (c - m\sqrt{C_{LF}})^2$$

$$C_{LF} = \frac{L_T}{\rho_L\left(\frac{\pi D_c^2}{4}\right)} = \frac{34.8988}{818\left(\frac{\pi 4.9^2}{4}\right)} = 0.002262$$

-continued $$\frac{C_S}{C_{SF}} = \frac{\frac{V_T}{\rho_V\left(\frac{\pi D_c^2}{4}\right)}\sqrt{\frac{\rho_V}{\rho_L - \rho_V}}}{(c - m\sqrt{C_{LF}})^2} = \frac{0.103218}{(0.4152 - 1.055\sqrt{0.002262})^2}$$

$$= 0.7747$$

From Eq. 18 above, the column 245 is operating at 0.77 of flood point. The corresponding pressure drop at the top of the distillation column 245 is obtained from FIG. 28 as 0.0264. Therefore, $$\left(\frac{\frac{\Delta p}{Z}}{\rho_L g}\right) = 0.0264 \quad (19)$$

$$\frac{\Delta p}{Z} = 0.0264 * 818 * 9.8 = 211.417 \text{ Pa/m}$$

To estimate the vapor density at the bottom of the column 245, the pressure at the bottom of the column is initially estimated, for example, to be about 150 torr. The initial estimate can be modified and the calculation can be repeated if the pressure at the bottom of the column 245 is significantly different from the initial estimate. The vapor density at the bottom of the column 245 is obtained from Eq. 20 as $$\rho_V = \frac{12.1877 PM}{\frac{B}{A - \log P - \log(760)} - C + 273.15} \quad (20)$$

$$= \frac{12.1877(150/760)(104)}{\frac{1420}{6.92409 - \log(150/760) - \log(760)} - 206 + 273.15}$$

$$= 0.683 \text{ kg/m}^3$$

Figure 34:
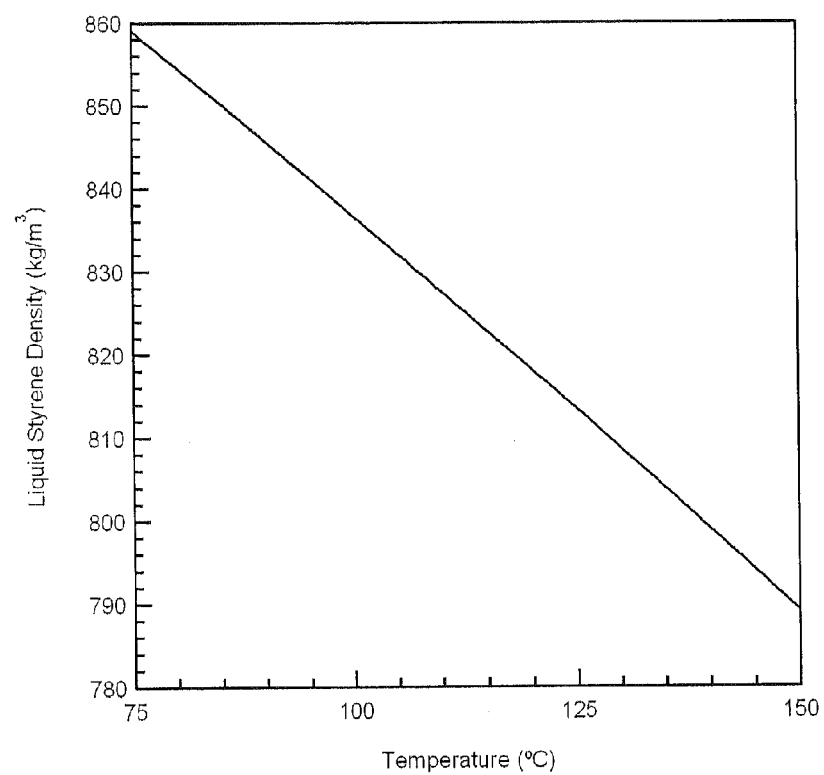
FIG. 34 is a graph of liquid styrene density as a function of temperature.

The density of liquid styrene as a function of temperature is shown in FIG. 34. Data for FIG. 34 was obtained from Lange's Handbook of Chemistry, 11$^{th}$ Edition (1973). From FIG. 34, the density of liquid styrene at a temperature of 100° C. is about 840 kg/m$^3$. Therefore, the fraction to flood point at the bottom of the column 245 is obtained from $$\sqrt{C_{SF}} + m\sqrt{C_{LF}} = c \quad (21)$$

$$C_{SF} = (c - m\sqrt{C_{LF}})^2$$

$$C_{LF} = \frac{L_B}{\rho_L\left(\frac{\pi D_c^2}{4}\right)} = \frac{44.8968}{840\left(\frac{\pi 4.9^2}{4}\right)} = 0.002834$$

$$\frac{C_S}{C_{SF}} = \frac{\frac{V_B}{\rho_V\left(\frac{\pi D_c^2}{4}\right)}\sqrt{\frac{\rho_V}{\rho_L - \rho_V}}}{(c - m\sqrt{C_{LF}})^2} = \frac{0.08628}{(0.4152 - 1.055\sqrt{0.002834})^2}$$

$$\cong 0.669$$

Figure 28:
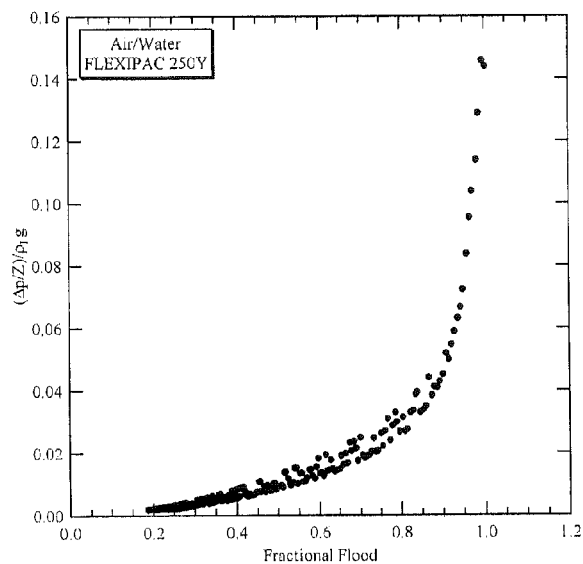
FIG. 28 is a graph of pressure drop in dimensionless units as a function of fractional approach to the flood point for FLEXIPAC 250Y obtained by methods of the invention.

From FIG. 28, the pressure drop at the bottom of the distillation column at this fractional flood is $$\left(\frac{\frac{\Delta p}{Z}}{\rho_L g}\right) \cong 0.02 \quad (22)$$

$$\frac{\Delta p}{Z} = 0.02 * 840 * 9.8 = 164.64 \text{ Pa/m}$$

The pressure drop in the rectifying section is assumed to be everywhere the same as the pressure drop at the top of the column 245 and the pressure drop in the stripping section is assumed to be everywhere the same as that at the bottom of the column 245. Therefore, the pressure at the bottom of the column is:

$$P_{bot} \cong P_{top} + (N_T)(HETP)\left(\frac{\Delta p}{Z}\right)_{top} + (N_B)(HETP)\left(\frac{\Delta p}{Z}\right)_{bot} \quad (23)$$

$$= 100 + (31.687)(0.4572)(1.586) + (67.021)(0.4572)(1.235)$$

$$= 160.82 \text{ torr}$$

This calculated pressure at the bottom of the column is approximately the same as the estimate used in Eq. 20, and is significantly less than the maximum bottom pressure of 192 torr. Therefore, this preliminary column design meets the column design requirements. Optionally, the desired product output rate, or the reflux ratio, or the pressure at the top of the column can be adjusted to operate the column at a pressure that is closer to the polymerization limit.

Figure 35:
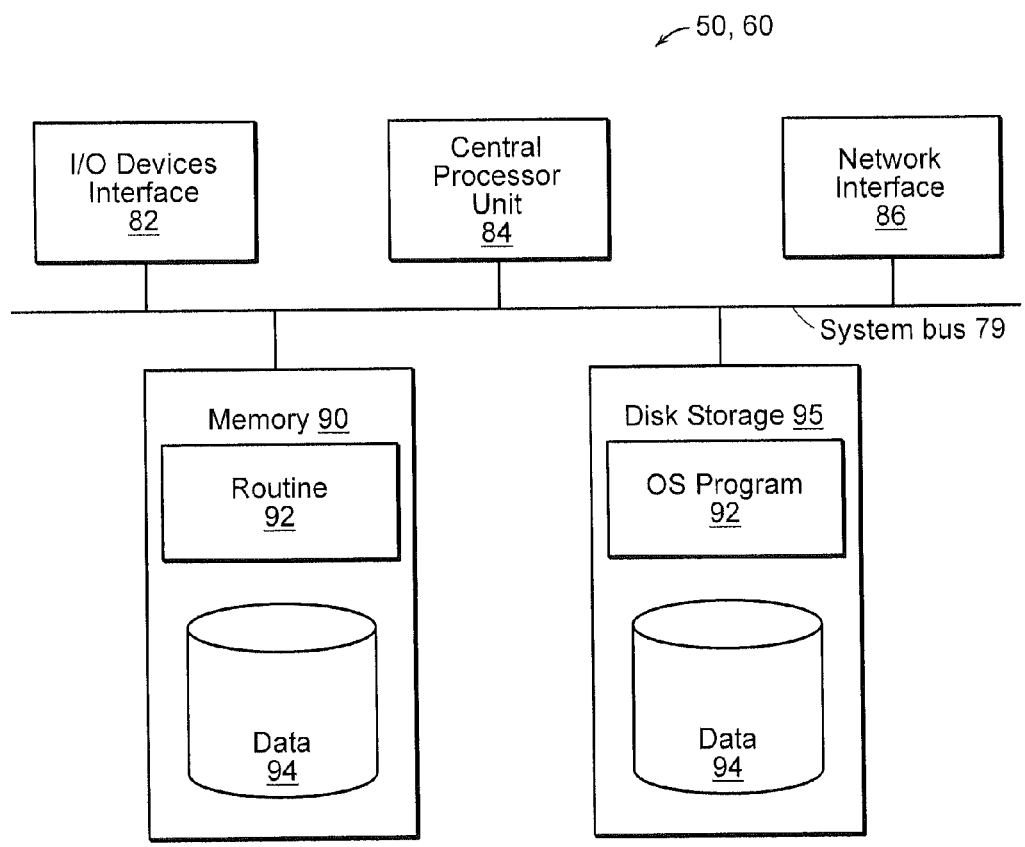
FIG. 35 is a block diagram of a computer apparatus implementing methods of the present invention.

FIG. 35 is a diagram of the internal structure of a computer (e.g., client processor/device 50 or server computers 60) in a computer network or other computer based environment in which the present invention can be implemented. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., global computer network, local area network, wide area network, and the like). Memory 90 provides volatile storage for computer software instructions 92 and data 94 used to implement an embodiment of the present invention (e.g., method 100 of determining flood point, predicting approach to flood, and/or optimizing column product output rate and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

The invention claimed is:

1. A method of optimizing a product output rate from a distillation column having a top and a bottom, comprising:
    (a) setting a desired product output rate from the distillation column having a packing;
    (b) calculating a fraction of flood point of the distillation column at a reflux ratio;
    (c) determining a two-phase pressure drop value within the distillation column at the fraction of flood point;
    (d) calculating a pressure at the bottom of the distillation column for a pressure at the top of the distillation column, and calculating the two-phase pressure drop value within the distillation column of a given length;
    (e) calculating a temperature corresponding to the calculated pressure at the bottom of the distillation column; and
    (f) adjusting the desired product output rate or the reflux ratio or the pressure at the top of the distillation column.

2. The method of claim 1, wherein the distillation column is a subject packed column.

3. The method of claim 2, wherein the subject packed column is operated with gas as vapor continuous phase and liquid as dispersed phase.

4. The method of claim 1, wherein determining a two-phase pressure drop value within the distillation column at the fraction of flood point includes using a plot of two-phase pressure drop value as a function of fraction of flood point, the plot obtained by the computer-implemented steps of:

(aa) providing a reference data set of two-phase pressure drop values as a function of gas and liquid flow rates for a reference liquid and a reference gas at several liquid flow rates through a reference packed column containing the same packing being used in the distillation column;

(bb) converting the reference data set to dimensionless two-phase pressure drop values as a function of the density of the liquid phase of a subject packed column thereby making the two-phase pressure drop values at flood inversely proportional to the density of the liquid phase;

(cc) providing a known flood point value for one liquid flow rate in the reference data set;

(dd) setting working flood point values for higher liquid flow rates at values lower than the known flood point value;

(ee) setting working flood point values for lower liquid flow rates at values higher than the known flood point value;

(ff) expressing gas flow rates for liquid flow rates as fractions of the working flood point value for each respective liquid flow rate in the reference data set; and (gg) at a constant two-phase pressure drop value:
  i) from the fractions of the working flood point value calculating an average fractional flood point value for the liquid flow rates; and
  ii) minimizing the standard deviation between the fractional flood point value at different liquid flow rates and the calculated average fractional flood point value by repeating steps (cc)-(gg) over reference two-phase pressure drop and liquid flow rate data.

5. The method of claim 4, wherein the known flood point value for one liquid flow rate equals a two-phase pressure drop of about one and a half inches of water per foot of column for the gas being air and the liquid being water.

6. The method of claim 4, wherein the known flood point value for one liquid flow rate equals a two-phase pressure drop of about two inches of water per foot of column for the gas being air and the liquid being water.

7. The method of claim 4, wherein the known flood point value for one liquid flow rate equals a gas flow rate at which a slope of dimensionless two-phase pressure drop values as a function of gas flow rate is equal to or greater than about two.

8. The method of claim 4, wherein the known flood point value for one liquid flow rate includes a user observation of an accumulation of liquid at the top of the packing.

9. The method of claim 1, wherein determining a pressure drop within the distillation column at the fraction of flood point includes using a mathematical expression of two-phase pressure drop as a function of fraction of flood point, the expression obtained by the computer-implemented steps of:

(aa) providing a reference data set of two-phase pressure drop values as a function of gas and liquid flow rates at several liquid flow rates through a packed column;

(bb) converting the reference data set to dimensionless two-phase pressure drop values as a function of the density of the liquid phase of a subject packed column thereby making the two-phase pressure drop values at flood inversely proportional to the density of the liquid phase;

(cc) providing a known flood point value for one liquid flow rate in the reference data set;

(dd) setting working flood point values for higher liquid flow rates at values lower than the known flood point value;

(ee) setting working flood point values for lower liquid flow rates at values higher than the known flood point value;

(ff) expressing gas flow rates for liquid flow rates as fractions of the working flood point value for each respective liquid flow rate in the reference data set; and (gg) at a constant two-phase pressure drop value:
  i) from the fractions of the working flood point value calculating an average fractional flood point value for the liquid flow rates; and
  ii) minimizing the standard deviation between the fractional flood point value at different liquid flow rates and the calculated average fractional flood point value by repeating steps (cc)-(gg) over reference two-phase pressure drop and liquid flow rate data.

10. The method of claim 9, wherein the known flood point value for one liquid flow rate equals a two-phase pressure drop of about one and a half inches of water per foot of column for the gas being air and the liquid being water.

11. The method of claim 9, wherein the known flood point value for one liquid flow rate equals a two-phase pressure drop of about two inches of water per foot of column for the gas being air and the liquid being water.

12. The method of claim 9, wherein the known flood point value for one liquid flow rate equals a gas flow rate at which a slope of dimensionless two-phase pressure drop values as a function of gas flow rate is equal to or greater than about two.

13. The method of claim 9, wherein the known flood point value for one liquid flow rate includes a user observation of an accumulation of liquid at the top of the packing.

14. A method of optimizing a product output rate from a distillation column having a top and a bottom, comprising:
  (a) setting a desired product output rate from the distillation column having a packing;
  (b) calculating a fraction of flood point of the distillation column at a reflux ratio;
  (c) determining a two-phase pressure drop value within the distillation column at the fraction of flood point;
  (d) calculating a pressure at the top of the distillation column for a pressure at the bottom of the distillation column, and calculating the two-phase pressure drop value within the distillation column of a given length;
  (e) calculating a temperature corresponding to the calculated pressure at the top of the distillation column; and
  (f) adjusting the desired product output rate or the reflux ratio or the pressure at the bottom of the distillation column.

15. The method of claim 14, wherein the distillation column is a subject packed column.

16. The method of claim 15, wherein the subject packed column is operated with gas as vapor continuous phase and liquid as dispersed phase.

17. The method of claim 14, wherein determining a two-phase pressure drop value within the distillation column at the fraction of flood point includes using a plot of two-phase pressure drop value as a function of fraction of flood point, the plot obtained by the computer-implemented steps of:

(aa) providing a reference data set of two-phase pressure drop values as a function of gas and liquid flow rates for a reference liquid and a reference gas at several liquid flow rates through a reference packed column containing the same packing being used in the distillation column;

(bb) converting the reference data set to dimensionless two-phase pressure drop values as a function of the density of the liquid phase of a subject packed column thereby making the two-phase pressure drop values at flood inversely proportional to the density of the liquid phase;

(cc) providing a known flood point value for one liquid flow rate in the reference data set;

(dd) setting working flood point values for higher liquid flow rates at values lower than the known flood point value;

(ee) setting working flood point values for lower liquid flow rates at values higher than the known flood point value;

(ff) expressing gas flow rates for liquid flow rates as fractions of the working flood point value for each respective liquid flow rate in the reference data set; and (gg) at a constant two-phase pressure drop value:
   iii) from the fractions of the working flood point value calculating an average fractional flood point value for the liquid flow rates; and
   iv) minimizing the standard deviation between the fractional flood point value at different liquid flow rates and the calculated average fractional flood point value by repeating steps (cc)-(gg) over reference two-phase pressure drop and liquid flow rate data.

18. The method of claim 17, wherein the known flood point value for one liquid flow rate equals a two-phase pressure drop of about one and a half inches of water per foot of column for the gas being air and the liquid being water.

19. The method of claim 17, wherein the known flood point value for one liquid flow rate equals a two-phase pressure drop of about two inches of water per foot of column for the gas being air and the liquid being water.

20. The method of claim 17, wherein the known flood point value for one liquid flow rate equals a gas flow rate at which a slope of dimensionless two-phase pressure drop values as a function of gas flow rate is equal to or greater than about two.

21. The method of claim 17, wherein the known flood point value for one liquid flow rate includes a user observation of an accumulation of liquid at the top of the packing.

22. The method of claim 14, wherein determining a pressure drop within the distillation column at the fraction of flood point includes using a mathematical expression of two-phase pressure drop as a function of fraction of flood point, the expression obtained by the computer-implemented steps of:

(aa) providing a reference data set of two-phase pressure drop values as a function of gas and liquid flow rates at several liquid flow rates through a packed column;

(bb) converting the reference data set to dimensionless two-phase pressure drop values as a function of the density of the liquid phase of a subject packed column thereby making the two-phase pressure drop values at flood inversely proportional to the density of the liquid phase;

(cc) providing a known flood point value for one liquid flow rate in the reference data set;

(dd) setting working flood point values for higher liquid flow rates at values lower than the known flood point value;

(ee) setting working flood point values for lower liquid flow rates at values higher than the known flood point value;

(ff) expressing gas flow rates for liquid flow rates as fractions of the working flood point value for each respective liquid flow rate in the reference data set; and (gg) at a constant two-phase pressure drop value:
   i) from the fractions of the working flood point value calculating an average fractional flood point value for the liquid flow rates; and
   ii) minimizing the standard deviation between the fractional flood point value at different liquid flow rates and the calculated average fractional flood point value by repeating steps (cc)-(gg) over reference two-phase pressure drop and liquid flow rate data.

23. The method of claim 22, wherein the known flood point value for one liquid flow rate equals a two-phase pressure drop of about one and a half inches of water per foot of column for the gas being air and the liquid being water.

24. The method of claim 22, wherein the known flood point value for one liquid flow rate equals a two-phase pressure drop of about two inches of water per foot of column for the gas being air and the liquid being water.

25. The method of claim 22, wherein the known flood point value for one liquid flow rate equals a gas flow rate at which a slope of dimensionless two-phase pressure drop values as a function of gas flow rate is equal to or greater than about two.

26. The method of claim 22, wherein the known flood point value for one liquid flow rate includes a user observation of an accumulation of liquid at the top of the column.

* * * * *

UNITED STATES PATENT AND TRADEMARK OFFICE
CERTIFICATE OF CORRECTION

PATENT NO. : 9,095,785 B2  
APPLICATION NO. : 13/874026  
DATED : August 4, 2015  
INVENTOR(S) : Brian Hanley Page 1 of 1

It is certified that error appears in the above-identified patent and that said Letters Patent is hereby corrected as shown below:

In the claims

Claim 17, column 17, line 16 delete "iii" and insert --i--.

Claim 17, column 17, line 19 delete "iv" and insert --ii--.

Signed and Sealed this
Twelfth Day of January, 2016

Michelle K. Lee
*Director of the United States Patent and Trademark Office*